United States Patent
Suzuki et al.

(10) Patent No.: US 7,630,065 B2
(45) Date of Patent: Dec. 8, 2009

(54) LOW-LIGHT SPECIMEN IMAGE PICKUP UNIT AND LOW-LIGHT SPECIMEN IMAGE PICKUP APPARATUS

(75) Inventors: Hirobumi Suzuki, Hino (JP); Shinichi Dosaka, Kanagawa (JP)

(73) Assignee: Olympus Corporation, Tokyo (JP)

(*) Notice: Subject to any disclaimer, the term of this patent is extended or adjusted under 35 U.S.C. 154(b) by 311 days.

(21) Appl. No.: 11/884,822

(22) PCT Filed: Feb. 16, 2006

(86) PCT No.: PCT/JP2006/302771

§ 371 (c)(1),
(2), (4) Date: Aug. 21, 2007

(87) PCT Pub. No.: WO2006/088109

PCT Pub. Date: Aug. 24, 2006

(65) Prior Publication Data

US 2008/0158566 A1    Jul. 3, 2008

(30) Foreign Application Priority Data

Feb. 21, 2005  (JP)  ............................. 2005-044737
Jan. 31, 2006  (JP)  ............................. 2006-023821

(51) Int. Cl.
*G02B 21/36* (2006.01)
*G01N 21/64* (2006.01)
*G01N 21/00* (2006.01)

(52) U.S. Cl. ......................................... 356/73; 356/417
(58) Field of Classification Search .................. 356/73, 356/417
See application file for complete search history.

(56) References Cited

U.S. PATENT DOCUMENTS

2001/0054676 A1   12/2001   Kawamura et al.

(Continued)

FOREIGN PATENT DOCUMENTS

CN            1550039 A       11/2004

(Continued)

OTHER PUBLICATIONS

Abstract of Japanese Patent Application No. 05-011191, published Jan. 19, 1993.

(Continued)

*Primary Examiner*—F. L Evans
(74) *Attorney, Agent, or Firm*—Scully, Scott, Murphy & Presser, P.C.

(57) ABSTRACT

In order to be able to take an image of a specimen emitting low light in a short exposure time by a cooled CCD at about 0° C., a low-light specimen image pickup unit has an imaging optical system forming a specimen image of a specimen having a point light source emitting a low light, and the low-light specimen image pickup unit further has an image pickup unit having a plurality of pixels receiving incident light, for taking an image corresponding to the specimen image. In the low-light specimen image pickup unit, the imaging optical system is telecentric to a side of the specimen image of the imaging optical system, and condenses the low light emitted from the point light source to form an Airy disk of a size which is substantially the same as a pixel of the pixels, or which is smaller than the pixel. Here, the pixel receives the low light emitted from the point light source.

30 Claims, 25 Drawing Sheets

U.S. PATENT DOCUMENTS

2003/0001172 A1    1/2003    Abe et al.

FOREIGN PATENT DOCUMENTS

| | | |
|---|---|---|
| JP | 2990871 | 10/1999 |
| JP | 2000-235150 | 8/2000 |
| JP | 2002-62480 | 2/2002 |
| JP | 2003-21788 | 1/2003 |
| JP | 2004-191252 | 7/2004 |
| JP | 2004-252035 | 9/2004 |
| WO | 03/005446 | 1/2003 |
| WO | WO 03/058321 A1 | 7/2003 |

OTHER PUBLICATIONS

David K. Welsh, et al., "Bioluminescence Imaging of Individual Fibroblasts Reveals Persistent, Independently Phased Circadian Rhythms of Clock Gene Expression," Current Biology, 2004, vol. 14, p. 2289B295.

N. Takasuka, et al. "Dynamic Changes in Prolactin Promoter Activation in Invividual Living Lactotrophic Cells," Endocrinology, 1998, vol. 139 p. 1361-1368.

RELATIONSHIP BETWEEN IMAGING SIDE NA AND AIRY DISK DIAMETER
$\phi di = 1.22 \lambda / NAi$ ; $\lambda = 0.6 \mu m$

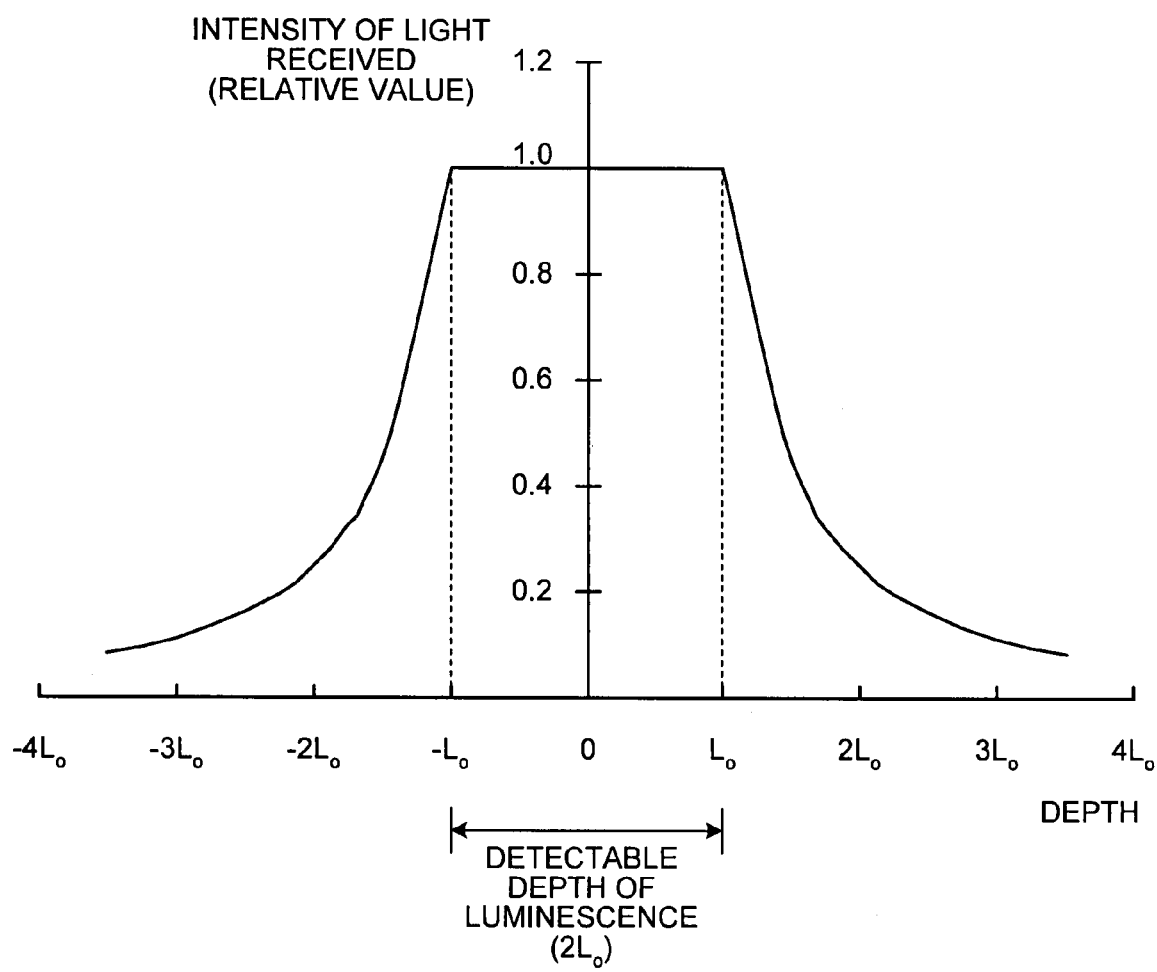

2X TOTAL MAGNIFICATION

4X TOTAL MAGNIFICATION

8X TOTAL MAGNIFICATION

FIG.14

| TOTAL MAGNIFICATION | SIZE OF IMAGE (DIAMETER) | NECESSARY NUMBER OF PIXELS OF CCD | CONSIDERATION RESULT |
|---|---|---|---|
| 2X | 50 μm | 8 × 8 | IT IS DIFFICULT TO OBSERVE A TARGET SHAPE TO A CERTAIN EXTENT, BUT THE BRIGHTNESS IS ENOUGH, AND THE VISUAL FIELD IS WIDE. |
| 4X | 100 μm | 16 × 16 | IT IS POSSIBLE TO USE UNIVERSALLY BETWEEN 2X MAGNIFICATION AND 8X MAGNIFICATION. |
| 8X | 200 μm | 32 × 32 | IT IS POSSIBLE TO CLEARLY DISTINGUISH OUTLINES OF CELLS, BUT IT IS DARK TO A CERTAIN EXTENT. |

FIG.15

| OBJECTIVE LENS SPECIFICATIONS | TOTAL MAGNIFICATION | DETECTABLE DEPTH OF LUMINESCENCE ($\mu$m) | DEPTH OF FOCUS ($\mu$m) |
|---|---|---|---|
| Oil 40X NA1.2 f5mm | 4 | 1.2 | 0.31 |
| | 8 | 0.62 | |
| | 16 | 0.31 | |
| | 40 | 0.12 | |
| Dry 20X NA0.8 f10mm | 2 | 3.96 | 0.94 |
| | 4 | 1.88 | |
| | 8 | 0.94 | |
| | 20 | 0.38 | |
| Dry 10X NA0.25 f20mm | 4 | 6 | 9.6 |
| | 10 | 2.4 | |
| Dry 5X NA0.15 f40mm | 2.5 | 16 | 26.6 |
| | 5 | 8 | |

FIG.16

| OBJECTIVE LENS TYPE | FOCAL LENGTH f (mm) | NUMERICAL APERTURE $NA_o$ | RESTRICTIVE CONDITION FOR NUMERICAL APERTURE |
|---|---|---|---|
| Dry 10X | 20 | 0.4 | RESTRICTION BY PUPIL DIAMETER |
| Dry 20X | 10 | 0.8 | RESTRICTION BY PUPIL DIAMETER |
| Oil 40X | 5 | 1.4 | RESTRICTION BY REFRACTIVE INDEX |
| Oil 100X | 2 | 1.4 | RESTRICTION BY REFRACTIVE INDEX |

FIG.27

| OBJECTIVE LENS SPECIFICATIONS | IMAGING LENS SPECIFICATIONS | TOTAL MAGNIFICATION | VISUAL FIELD NUMBER ON CCD | BRIGHTNESS | APPLICATION |
|---|---|---|---|---|---|
| Oil 40X NA1.2 f5mm VISUAL FIELD 0.6mm | f20mm NA0.35 | 4 | 2.4 | 1.8 | FOR LOW LUMINOUS SPECIMEN |
|  | f40mm NA0.2 | 8 | 4.8 | 0.2 | FOR HIGH-POWER OBSERVATION AND PHOTOMETRY |
| Dry 20X NA0.8 f10mm VISUAL FIELD 1.2mm | f20mm NA0.35 | 2.0 | 2.4 | 8 | FOR ONLY PHOTOMETRY (EFFECTIVE NA 0.6) |
|  | f40mm NA0.2 | 4 | 4.8 | 1 |  |

LOW-LIGHT SPECIMEN IMAGE PICKUP UNIT AND LOW-LIGHT SPECIMEN IMAGE PICKUP APPARATUS

TECHNICAL FIELD

The present invention relates to a low-light specimen image pickup unit and a low-light specimen image pickup apparatus which take an image of a specimen emitting a low light, and in particular, to a low-light specimen image pickup unit and a low-light specimen image pickup apparatus which are suitable for being applied to taking an image of a specimen having minute luminescent sources such as a specimen generating low fluorescence or a biological fluorescent specimen.

BACKGROUND ART

In recent years, in the research field of cell biology, molecular biology, and the like, the necessity to observe biological cells such that a green fluorescent protein (GFP; Green Fluorescent Protein) or a luciferase gene which is a bioluminescent enzyme is made to function as a reporter of expression, and a fluorescent sign or a luminescent sign is attached to a specific portion or a functional protein in a cell, has grown.

In observation using a GFP, because the GFP is protein generating fluorescence in accordance with irradiation of an excitation light, and fluorescence is obtained by irradiating a high-intensity excitation light onto a specimen on which the GFP has been acted, the specimen is easily damaged, and an observation time is limited to about one or two hours. However, in observation using a luciferase, because the luciferase is a self-luminous enzyme, and an excitation light causing damage to a specimen is not required, observation for about five days is possible. On the other hand, in observation using a GFP, for example, it is possible to increase a quantity of generated fluorescence by converging an excitation light onto one point of a specimen by a confocal laser scanning microscope. However, in observation using a luciferase, because a light quantity cannot be increased by an excitation light, it is necessary to observe a specimen with low light from the luciferase.

Generally, there are a broad range of applications to detect low light, and not only in observation using a luciferase, but also in observation using a GFP, there are a case in which observation is carried out by lowering an excitation light, photometry of fluorescence from a DNA chip, dark visual field observation of flagellum of micro organism, and the like. A high-sensitivity cooled CCD camera has been actively developed for such applications.

Further, in an application to detect low light, in order to be able to condense more light from a specimen, conventionally, an objective lens having large NA (numerical aperture) is used as an optical system which forms an image of a specimen. Note that there is a case in which an NA at an imaging side is made greater by disposing a demagnifying lens at an image side of an imaging lens of a microscope separately from a case in which an NA at a specimen side is made greater by an objective lens. However, an object thereof is, not for observing low light, but to conform sizes of a visual field of a visual observation and a visual field imaged by a CCD.

FIG. 28 shows one example of an imaging optical system in which a demagnifying lens is disposed. As shown in FIG. 28, a demagnifying lens 104 is disposed in a space between the imaging lens 103 and an image surface 106 which is an image space of the imaging optical system formed from an objective lens 102 and an imaging lens 103, which forms an imaging optical system telecentric as a whole at the image side. An object point 101a on an optical axis OA3 and an object point 101b out of the optical axis OA3 on a specimen 101 are respectively imaged onto image points 106a and 106b on the image surface 106 when the lens 104 is not disposed. However, when the lens 104 is disposed, those are respectively imaged onto image points 105a and 105b. Further, in this example, the image point 105b is imaged at a height about half that of the image point 106b. Note that a position and an aperture of exit pupil Pu of the imaging optical system are set to be not changed regardless of the presence or absence of the disposition of the lens 104.

Further, the imaging optical system telecentric to an image side as shown in FIG. 28 is conventionally commonly used for a length measuring microscope or the like, and is used as an optical system dispensable for a CCD camera in recent years. The imaging optical system telecentric on an image side is an optical system whose exit pupil is positioned at infinity, and is an optical system in which chief rays which are ejected from the optical system and go toward respective image points are made parallel to the optical axis. Usually, because the sensitivity of a CCD camera is reduced as an incident angle of light with respect to an imaging area is made greater, in order to take an image evenly and at high sensitivity on the entire imaging area, it is necessary to make chief rays of light incident into the respective pixels of the CCD camera perpendicular to the imaging area, and in order to realize this, an imaging optical system telecentric on an image side is essential.

In addition thereto, the imaging optical system telecentric on an image side is commonly used for a microscope or the like (for example, refer to Patent Documents 1 and 2). In a microscope disclosed in Patent Document 1, it is possible to maintain the image side to be telecentric even when the objective lens is replaced by disposing a replaceable optical unit in accordance with a change in an exit pupil position associated with the replacement of objective lenses. Further, in a microscope disclosed in Patent Document 2, it is possible to obtain a sharp observed image without generating an interference pattern on an imaging area even when a laser source is used by slightly inclining an imaging area of the CCD camera with respect to the optical axis.

Note that, the development for making a high-resolution CCD camera has been carried out separately from making a high-sensitivity CCD camera, and a high-definition CCD camera in which pixel sizes are 2 to 3 μm, and a pixel count is five millions has been realized. Then, an apparatus called a virtual slide has been developed by combining such a high-definition CCD camera and a microscope. In a virtual slide, a plurality of images taken after dividing a specimen on a preparation into a plurality of areas are acquired in advance by using an imaging optical system of about 20 magnifications, and in which an image surface curvature and distortion are suppressed to be less, and after the acquired respective images are joined together on image data, an image of arbitrary magnifications of about 5 to 100 magnifications is displayed on a monitor by electronic zooming serving as electronic enlargement processing. In this way, because it is possible to display a high-definition image of a specimen even without any actual microscope and specimen, a virtual slide is utilized as an educational tool for medical students.

Patent Document 1: Japanese Patent No. 2990871
Patent Document 2: Japanese Patent Application Laid-Open No. 2000-235150
Patent Document 3: Japanese Patent Application Laid-Open No. 2004-191252

Nonpatent Literature 1: David K. Welsh, Seung-Hee Yoo, Andrew C. Liu, Joseph S. Takahashi, and Steve A. Kay, "Bioluminescence imaging of Individual Fibroblasts Reveals Persistent, Independently Phased Circadian Rhythms of Clock Gene Expression", Current Biology, 2004, Vol. 14, p. 2289B295

Nonpatent Literature 1: N. Takasuka, M. R. H. White, C. D. Wood, W. R. Robertson, and J. R. E. Davis, "Dynamic Changes in Prolactin Promoter Activation in Individual Living Lactotrophic Cells", Endocrinology, 1988, Vol. 139 p. 1361-1368

DISCLOSURE OF INVENTION

Problem to be Solved by the Invention

By the way, when a luciferase gene is introduced as a reporter gene into a cell, and the intensity of expression of the luciferase gene is checked by using a quantity of luminescence from the cell due to luciferase activity as an index, it is possible to check the effect on the transcription of the luciferase gene by the DNA fragments by connecting target DNA fragments to the upstream or the downstream of the luciferase gene. Further, a gene such as transcription factor, which is considered to exercise an effect on the transcription of the luciferase gene, is expressed together with the luciferase gene, which makes it possible to check an effect on the expression of the luciferase gene by a gene product thereof.

There are a calcium phosphate method, a lipofectin method, an electroporation method, and the like as a method for introducing a reporter gene such as a luciferase gene into a cell, and these methods are properly used in accordance with a purpose of introduction or a type of a cell. Then, in the measurement of a quantity of luminescence from cells due to luciferase activity, after a cytolytic solution is reacted with a substrate solution including luciferin, ATP, magnesium, and the like, a quantity of luminescence is determined by a luminometer using a photomultiplier. In this measurement, because a quantity of luminescence is measured after cells are dissolved, an expression level at a certain point in time is measured as an average value in the entire cells.

Further, in order to know change in an expression level of a gene over time, it is necessary to measure a quantity of luminescence from a living cell in time series. For example, a function of a luminometer is provided to an incubator in which cells are incubated, and a quantity of luminescence from an entire cell mass which is being incubated is measured at regular time intervals, which makes it possible to measure an expression rhythm or the like at a constant frequency. In this case, change in an expression level in the entire cells over time is measured.

On the other hand, when a gene expression is temporary, great variations are brought about in an expression level in individual cells. For example, even in a cultured cell such as a HeLa cell which has been cloned, a response of a medical agent through a receptor on a surface of cell membrane varies in individual cells in some cases. Namely, there are cases in which several cells respond even when a response as the entire cells is not detected. In this case, it is important to measure an expression level, not from the entire cells, but in individual cells.

However, in order to observe luminescence from individual cells by a microscope or the like, there has been the problem that, because a quantity of luminescence from a living cell is extremely faint, it is necessary to carry out exposure for a long time of about 30 minutes by use of a high-sensitivity CCD camera such as a photon counting CCD camera or a cooled CCD camera at about −90° C. (refer to Nonpatent Literatures 1 and 2).

The present invention has been achieved in consideration of the above-described circumstances, and an object of the present invention is to provide a low-light specimen image pickup unit and a low-light specimen image pickup apparatus which are capable of taking an image of a specimen for a short time of exposure without photon-counting by a cooled CCD camera at a relatively high temperature of about 0° C. even in a case of a specimen emitting low light such as a cell into which luciferase genes are introduced as luminous pigments.

Means for Solving Problem

A low-light specimen image pickup unit according to one aspect of the present invention has an imaging optical system and an image pickup unit. Here, the imaging optical system forms a specimen image of a specimen having a point light source emitting a low light. Further, the image pickup unit has a plurality of pixels receiving incident light, and takes an image corresponding to the specimen image. In the low-light specimen image pickup unit, the imaging optical system is telecentric on a specimen image side of the imaging optical system, and condenses the low light emitted from the point light source to form an Airy disk of a size which is smaller than or substantially equal to a size of a pixel of the pixels, the pixel receiving the low light emitted from the point light source.

In the low-light specimen image pickup unit, the imaging optical system may have an objective lens and an imaging lens. The objective lens is telecentric on the specimen image side of the imaging optical system and converting the low light emitted from the point light source into a parallel beam, and the imaging lens condenses the parallel beam converted by the objective lens to form the Airy disk.

In the low-light specimen image pickup unit, the objective lens may be replaceable with a replacement objective lens different from the objective lens in at least one of a focal length and a specimen-side numerical aperture.

In the low-light specimen image pickup unit, the objective lens may have an objective layout datum plane serving as a reference position when the objective lens is disposed, and is replaceable with the replacement objective lens substantially similar to the objective lens in distances from the objective layout datum plane to a specimen-side focal point and to an exit pupil.

In the low-light specimen image pickup unit, the objective lens may have a variable aperture stop whose opening diameter is variable.

In the low-light specimen image pickup unit, the imaging lens may be replaceable with a replacement imaging lens different from the imaging lens in at least one of a focal length and a specimen-side numerical aperture.

In the low-light specimen image pickup unit, the imaging lens may have an imaging layout datum plane serving as a reference position when the imaging lens is disposed, and is replaceable with the replacement imaging lens substantially similar to the imaging lens in distances from the imaging layout datum plane to a specimen-side focal point and to an exit pupil.

In the low-light specimen image pickup unit, the imaging lens may have an entrance pupil diameter of a size which is greater than or equal to an exit pupil diameter of the objective lens.

In the low-light specimen image pickup unit, the image pickup unit may be replaceable with a replacement image pickup unit different from the image pickup unit in a predetermined imaging property.

In the low-light specimen image pickup unit, an imaging magnification of the imaging optical system may be greater than or equal to substantially 2×, and less than or equal to substantially 8×.

The low-light specimen image pickup unit according to the present invention may have the low-light specimen image pickup unit mentioned above, a specimen holding unit that holds the specimen, an illumination unit that illuminates the specimen, and a focus adjusting unit that focuses the low-light specimen image pickup unit on the specimen by moving at least one of the imaging optical system, the image pickup unit, and the specimen holding unit in an optical axis direction of the low-light specimen image pickup unit. In the low-light specimen image pickup unit, the imaging optical system condenses an illumination light which is irradiated by the illumination unit and transmitted through or reflected on the specimen so that a bright visual field specimen image of the specimen is formed, and the focus adjusting unit performs the focusing so as to form the bright visual field specimen image sharply.

The low-light specimen image pickup unit according to the present invention may have the low-light specimen image pickup unit mentioned above, a specimen holding unit that holds the specimen, an illumination unit that illuminates the specimen, a focus adjusting unit that focuses the low-light specimen image pickup unit on the specimen by moving at least one of the objective lens, the imaging lens, the image pickup unit, and the specimen holding unit in an optical axis direction of the low-light specimen image pickup unit. In the low-light specimen image pickup unit, the imaging optical system condenses illumination light which is irradiated by the illumination unit transmitted through or reflected on the specimen so that a bright visual field specimen image of the specimen is formed, and the focus adjusting unit performs the focusing so as to form the bright visual field specimen image sharply.

The low-light specimen image pickup unit may have a fluorescent unit and a fluorescence irradiating unit. The fluorescent unit has an excitation light transmitting filter, a fluorescence transmitting filter, and a dichroic mirror. The fluorescent unit is detachable between the objective lens and the imaging lens. The excitation light transmitting filter selectively transmits an excitation light exciting the specimen, the fluorescence transmitting filter selectively transmits a fluorescence generated from the specimen excited by the excitation light, and the dichroic mirror reflects the excitation light and transmits the fluorescence. The fluorescence irradiating unit has an excitation light source emitting an excitation light, and controls to reflect the excitation light emitted from the excitation light source by the dichroic mirror to be irradiated onto the specimen. In the low-light specimen image pickup unit, the imaging optical system condenses the fluorescence as the low light to form the Airy disk.

The low-light specimen image pickup unit may have a fluorescence switching unit that holds a plurality of the fluorescent units different from one another in optical properties with respect to at least one of the excitation light and the fluorescence, and selectively disposes one fluorescent unit among the plurality of the fluorescent units between the objective lens and the imaging lens.

In the low-light specimen image pickup unit, the fluorescence irradiating unit may irradiate the excitation light as a substantially parallel beam onto the specimen.

The low-light specimen image pickup unit may have a wavelength extracting filter that is detachable between the objective lens and the imaging lens, and extracts a light within a predetermined wavelength band from the low light.

The low-light specimen image pickup unit may have a filter switching unit that holds a plurality of the wavelength extracting filters different from one another in a wavelength band to be extracted, and selectively disposes at least one wavelength extracting filter among the plurality of the wavelength extracting filters between the objective lens and the imaging lens.

The low-light specimen image pickup unit may have a dichroic mirror, a reflecting side imaging lens, and a reflecting side image pickup unit. The dichroic mirror is detachable between the objective lens and the imaging lens. Further, the dichroic mirror transmits a light within a predetermined first wavelength band among the low light, and reflects a light within a second wavelength band different from the first wavelength band. The reflecting side imaging lens condenses the light within the second wavelength band reflected by the dichroic mirror. The reflecting side image pickup unit has a plurality of pixels, and receives the light within the second wavelength band condensed by the reflecting side imaging lens. In the low-light specimen image pickup unit, the reflecting side imaging lens forms an Airy disk of a size internally touching a light receiving area of the pixel which the reflecting side image pickup unit has.

The low-light specimen image pickup unit may have a dichroic mirror switching unit that holds a plurality of the dichroic mirrors different from one another in at least one of the first wavelength band and the second wavelength band, the dichroic mirror switching unit selectively disposing one dichroic mirror among the plurality of the dichroic mirrors between the objective lens and the imaging lens.

The low-light specimen image pickup unit may have a transmitting side wavelength extracting filter and a reflecting side wavelength extracting filter. The transmitting side wavelength extracting filter is detachable between the dichroic mirror and the imaging lens, and extracts a light within a predetermined third wavelength band from the light within the first wavelength band. The reflecting side wavelength extracting filter is detachable between the dichroic mirror and the reflecting side imaging lens, and extracts a light within a predetermined fourth wavelength band from the light within the second wavelength band.

The low-light specimen image pickup unit may have a mirror, a bright visual field imaging lens, and a bright visual field image pickup unit. The mirror is detachable between the objective lens and the imaging lens, and reflects the illumination light transmitted through or reflected on the specimen. The bright visual field imaging lens that condenses an irradiation light reflected by the mirror to form a bright visual field image of the specimen. The bright visual field image pickup unit that takes a bright visual field image corresponding to the bright visual field image formed by the bright visual field imaging lens.

The low-light specimen image pickup unit may have a positioning unit that performs aligning of at least one of the image pickup unit, the reflecting side image pickup unit, and the bright visual field image pickup unit by moving the imaging optical system or the image pickup unit in a direction substantially perpendicular to an optical axis of the low-light specimen image pickup unit.

The low-light specimen image pickup unit may have a condition control unit that performs an automatic control of at least one of the focusing by the focus adjusting unit and the alignment by the positioning unit.

In the low-light specimen image pickup unit, the specimen holding unit may have a housing unit that holds the specimen internally, and an environment adjusting unit that adjusts an environment condition inside the housing unit.

In the low-light specimen image pickup unit, the environment condition may be a condition corresponding to at least one of a temperature, a humidity, an air pressure, and a component density inside the housing unit.

In the low-light specimen image pickup unit, the low-light specimen image pickup apparatus may be disposed in a shading unit that shades a light from outside.

The low-light specimen image pickup unit may have a display unit that superimposes an image corresponding to the bright visual field specimen image and an image corresponding to the specimen image by the low light with each other, and displays the superimposed images. Here, the images are taken by the image pickup unit.

EFFECT OF THE INVENTION

According to the low-light specimen image pickup unit and the low-light specimen image pickup apparatus of the present invention, even in a case of a specimen emitting a low light such as a cell into which luciferase genes are introduced as luminous pigments, it is possible to take an image of the specimen for a short time of exposure without photon counting by a cooled CCD camera at a relatively high temperature of about 0° C.

BRIEF DESCRIPTION OF DRAWINGS

FIG. 12 is a diagram showing a change in a photometric quantity with respect to a depth of a specimen;

FIG. 14 is a table showing results of consideration of a status of a specimen image by low light at each total magnification of the low-light specimen image pickup unit;

FIG. 15 is a table showing correspondence relationships among objective lenses, total magnifications, detectable depths of luminescence, and depth of focus in the low-light specimen image pickup unit;

FIG. 16 is a table showing focal lengths and numerical apertures corresponding to the types of objective lenses for microscope;

FIG. 27 is a table showing imaging lenses corresponding to objective lenses which can be applied to the low-light specimen image pickup unit and the low-light specimen image pickup apparatus shown in FIG. 6, and performance specifications in combinations thereof.

EXPLANATIONS OF LETTERS OR NUMERALS

Figure 1:
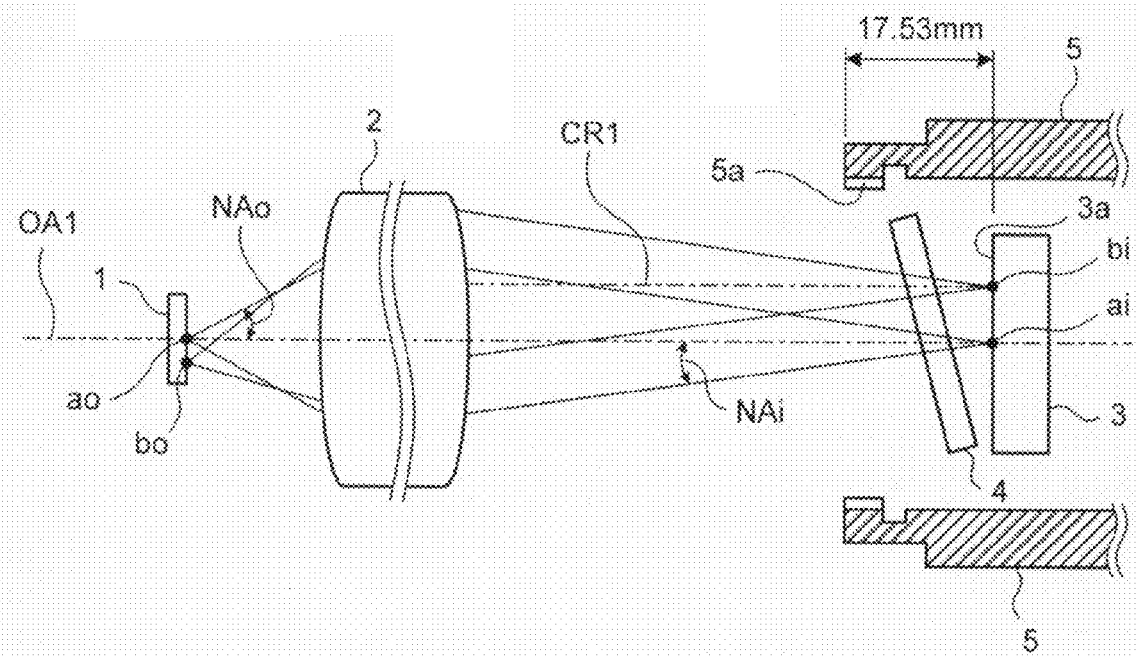
FIG. 1 is a diagram showing a structure of a low-light specimen image pickup unit according to an embodiment 1 of the present invention.

1, 101 Specimen
2 Image pickup lens
3, 34a to 34c CCD
3a Imaging area
3$p_n$ Pixel
4 Infrared light cut filter
5 Camera housing
5a Fixing screw
6, 6-1 to 6-3, 102 Objective lens
6a, 7a, 9 Lens-barrel
7, 7-1 to 7-5, 37, 103 Imaging lens
8 Aperture stop
10 Connecting lens-barrel
11 Main body rack
11b Operation dial
12 Base rack
13 Specimen support
14 Illumination rack
15 Illumination fiber
21 Excitation filter
22 Absorption filter
23, 35 Dichroic mirror
24 Fluorescent cube
25 Floodlight tube for fluorescence
26 Excitation light source
27 Parallel beam light source
28 Beam expander
29 Floodlight lens
30 Wavelength selecting mirror
31 Filter unit
31c Hole
32, 33 Wavelength extracting filter
32SP, 33LP Transmittance curve
35G, 35R Spectroscopic characteristic curve
36 Spectroscopic cube
38 Mirror
39 Switching device
41 Base
42 Enclosure
43 Cover
44 Hinge
45 Knob
46 Control device
47 Input device
48 Display device
51 petri dish
52 Partition
53 Transparent plate
54 Air supply pipe
55 Air exhaust pipe
101a, 101b Object point
104 Lens
105, 106 Image surface
105a, 105b, 106a, 106b Image point
ao, bo, oc, of Point light source
ai, bi, oci, ofi Image point
AD Airy disk
AD1, AD2, AD3a, AD3b Light quantity distribution curve
C1-C4 Camera
CR1, CR2 Chief ray
DI DNA individual image
FI Visual field image
IM Image surface
OA, OA', OA1 to OA3 Optical axis
Pu Exit pupil
PH Pinhole
PP Posterior focal point
PS Excitation pinhole

BEST MODES FOR CARRYING OUT THE INVENTION

Exemplary embodiments of a low-light specimen image pickup unit and a low-light specimen image pickup apparatus according to the present invention will be described in detail with reference to the accompanying drawings. Note that the present invention is not limited by those embodiments. Further, portions which are the same are denoted by the same reference numerals.

EMBODIMENT 1

First, a low-light specimen image pickup unit according to an embodiment 1 of the present invention will be described. FIG. 1 is a schematic diagram showing a structure of the low-light specimen image pickup unit according to the embodiment 1. As shown in FIG. 1, the low-light specimen image pickup unit according to the embodiment 1 has, along an optical axis OA, a specimen 1 serving as an object to be observed and emitting a low light, an image pickup lens 2 serving as an imaging optical system, an infrared light cut filter 4 shading infrared light, and a CCD 3 which is a solid-state image pickup device serving as an image pickup unit.

The image pickup lens 2 detects light from respective point light sources within a predetermined visual field on the specimen 1 at numerical aperture $NA_o$, and forms an image of the specimen 1 onto the imaging area 3a of the CCD 3 perpendicular to the optical axis OA1 so as to be telecentric at numerical aperture $NA_i$. The image pickup lens 2 condenses light from point light sources ao and bo on the specimen 1 to be respectively imaged onto image points ai and bi on the imaging area 3a. At that time, a chief ray CR1 of the light imaged on the image point bi is made parallel to the optical axis OA1 by the image pickup lens 2, and is perpendicularly incident into the imaging area 3a. In the same way, chief rays of the light imaged onto the respective points on the imaging area 3a other than the imaging point bi are made parallel to the optical axis OA1 by the image pickup lens 2, and are perpendicularly incident into the imaging area 3a. Note that the telecentric imaging by the image pickup lens 2 is not limited to a case in which the respective chief rays are made precisely parallel to the optical axis OA1, and a case in which those are made substantially parallel to the optical axis OA1 is included. Further, the image pickup lens 2 corrects for spherical aberration, astigmatism, or the like which is brought about by the infrared light cut filter 4. Note that the numerical aperture $NA_o$ is desirably made to be about 0.7 or more, and there is no need to interpret it as meaning of the limit to 0.7 or more, and for example, this can be used as 0.6.

The CCD 3 is a high-sensitivity monochrome CCD, and is realized by a cooled CCD at a relatively high temperature of about 0° C. The CCD 3 is held integrally with the infrared light cut filter 4 in the camera housing 5. The camera housing 5 has a fixing screw 5a corresponding to the C-mount specification, and holds the CCD 3 so as to allocate the imaging area 3a at a position where a flange focus which is an air conversion length from an end face 5b is 17.53 mm.

Figure 2:
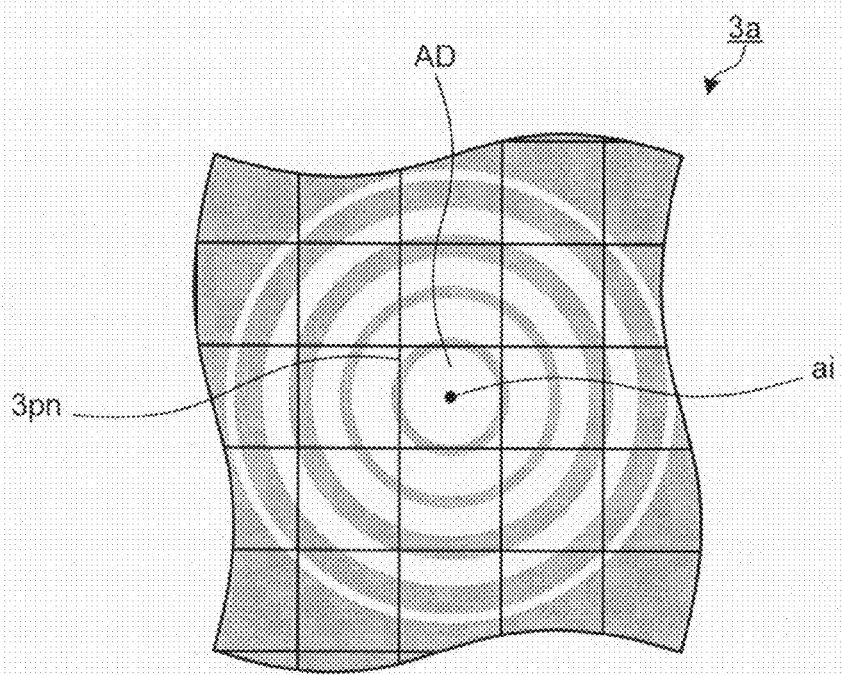
FIG. 2 is a diagram showing an Airy disk formed by the low-light specimen image pickup unit shown in FIG. 1.
Figure 3A:
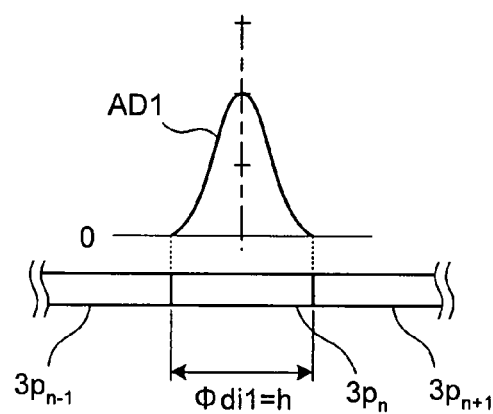
FIG. 3A is a diagram showing a light quantity distribution of the Airy disk when an Airy disk diameter and a size of a light receiving area in a pixel are made to be substantially the same.

Here, the condition under which the image pickup lens 2 images point light sources on the specimen 1 on the imaging area 3a will be described. Generally, images of the point light sources imaged by a lens system form a bright and dark orbicular zone formed stripe pattern in a case of a source of monochromatic light, and the brightest disk part at the central portion of the stripe pattern is called an Airy disk. The image pickup lens 2 detects light from the point light sources on the specimen 1 at a numerical aperture $NA_o$, and forms an image of the point light source ao onto the image point ai by forming an Airy disk AD of a size approximately touching internally a light receiving area in a pixel $3p_n$ on the imaging area 3a. Namely, the image pickup lens 2 forms an image of the point light source ao such that the diameter of the Airy disk AD and the size of the light receiving area in the pixel $3p_n$ are made approximately equal. A light quantity distribution in the Airy disk AD is shown by a light quantity distribution curve AD1 as shown in FIG. 3A. About 90% of a light quantity imaged onto the image point ai is condensed in the Airy disk AD, and all the light in the Airy disk AD is received at the pixel $3p_n$. Note that, in order to avoid troublesome matters, in FIGS. 2 and 3A, the respective pixels and the light receiving areas in the respective pixels are shown in one size.

Next, a relational expression between an Airy disk diameter and a numerical aperture or the like is shown. Generally, an Airy disk diameter $\phi d_i$ formed by imaging at a numerical aperture $NA_i$ is shown by the following equation (1) given that a wavelength of light to be imaged is $\lambda$.

$$\phi d_i = 1.22 \cdot \lambda / NA_i \quad (1)$$

Figure 4:
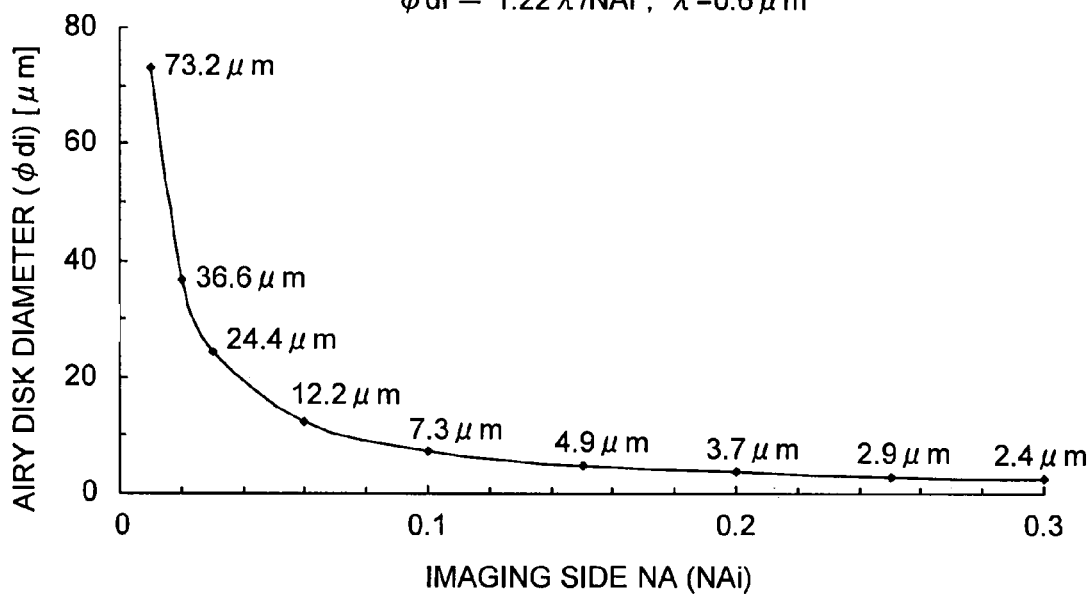
FIG. 4 is a graph showing a relationship between an NA at an imaging side and an Airy disk diameter.

Given that wavelength $\lambda$ is 0.6 μm, a relation between the Airy disk diameter $\phi d_i$ obtained from the equation (1) and the numerical aperture $NA_i$ is as shown in FIG. 4.

Here, because a magnification $M_g$ of the image pickup lens 2 is expressed by the following expression (2) by use of numerical apertures $NA_o$ and $NA_i$, the expression (1) is converted into equation (3).

$$M_g = NA_o / NA_i \quad (2)$$

$$\phi d_i = 1.22 \cdot \lambda \cdot M_g / NA_o \quad (3)$$

Further, because resolution $\epsilon$ on the specimen 1 of the image pickup lens 2 is expressed by the following equation (4) on the basis of the standard of the Reyleigh resolution, the equation (3) is converted into equation (5).

$$\epsilon = 0.61 \cdot \lambda / NA_o \quad (4)$$

$$\phi d_i = 2 \cdot \epsilon \cdot M_g \quad (5)$$

On the other hand, resolution L on imaging area 3a of the image pickup lens 2 is expressed by the following equation (6) on the basis of the standard of the Reyleigh resolution.

$$L = 0.61 \cdot \lambda / NA_i \quad (6)$$

The equation (6) is converted into equation (7) by use of the equation (2) and the equation (4).

$$L = \epsilon \cdot M_g \quad (7)$$

Moreover, the equation (7) is converted into equation (8) by use of the equation (5).

$$L = (1/2) \cdot \phi d_i \quad (8)$$

Generally, when image-pickup is carried out by an image pickup device such as a CCD, in order to obtain a sharp image without generating Moire fringes, at least two pixels are necessary in a size corresponding to the resolution L due to a sampling theorem. On the basis of this condition, given that a size of each pixel of the CCD 3 is h, and the resolution L is 2 h, and those are substituted for the equation (8), the following equation (9) is obtained.

$$\phi d_i = 4 \cdot h \quad (9)$$

It can be understood from this equation (9) that it is necessary to put at least four pixels in the Airy disk in order to obtain a sharp image without generating Moire fringes.

However, because the specimen 1 emitting low light is a cell into which, for example, luciferase genes are introduced as luminous pigments, and sources of luminescence as small as regarded as point light sources are scattered about in a dark background, there is no need to consider an effect of Moire fringes. Accordingly, in the low-light specimen image pickup unit according to the embodiment 1, there is no need to consider the condition shown by the equation (9), and as shown in FIGS. 2 and 3A, an Airy disk diameter and a size of a light receiving area in one pixel are made approximately equal, and a loss in the quantity of light received is reduced, and an S/N ratio of the CCD is improved, which makes it possible to receive low light from the point light sources concentrated in the Airy disk at high sensitive.

Figure 3B:
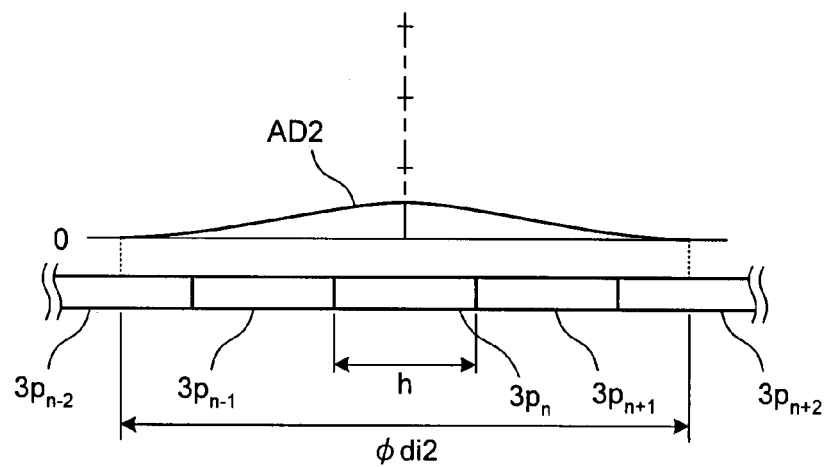
FIG. 3B is a diagram showing a light quantity distribution of the Airy disk when four pixels are included in an Airy disk.

In order to satisfy the condition shown by the equation (9), for example, as shown in FIG. 3B, a light quantity distribution curve AD2 whose Airy disk diameter is $\phi d_i 2$ straddles five pixels $3p_{n-2}$ to $3p_{n+2}$. Therefore, the light condensed by the image pickup lens 2 is received to be shared by 21 pixels (pixels except for the pixels at the four corners which do not receive light among 5×5 pixels) in the Airy disk on the imaging area 3a. In this case, a constant noise (dark current) is brought about in each pixel, and there is a great difference between the cases in which an S/N ratio which is a ratio between light from the image pickup lens 2 and a dark current, and light from the image pickup lens 2 is concentrated onto one pixel. In the photometry of low light, increasing an S/N ratio results in preparing a bright image.

A dark current is a current generated because a light receiving unit of the CCD is highly sensitive to an infrared light, and the CCD itself receives an infrared light generated due to an increase in temperature of the CCD and the CCD driving circuit when CCD is driven. This dark current can be reduced by cooling down the CCD, and generally, at about room temperature, the dark current is reduced to be half every time a temperature of the CCD is reduced by 8° C. In recent years, an extremely high-sensitivity CCD in which the generation of infrared light and dark current is markedly suppressed by being cooled down to −140° C., has been developed. However, an S/N ratio sufficient to be able to observe a low luminous pigment such as a luciferase gene sharply in a short time, has not been obtained.

In contrast thereto, in the low-light specimen image pickup unit according to the embodiment 1, by making an Airy disk diameter and a size of a light receiving area in one pixel approximately equal, a quantity of light received in one pixel and an electromotive current are increased, and an S/N ratio is improved, which makes it possible to take images of the point light sources on the specimen 1 at high sensitivity. Therefore, even with respect to a low luminous pigment such as a luciferase gene, it is possible to obtain sufficient sensitivity as high as possible to take images in a short exposure time of about several minutes without photon-counting by a cooled CCD at a relatively high temperature of about 0° C.

Figure 3C:
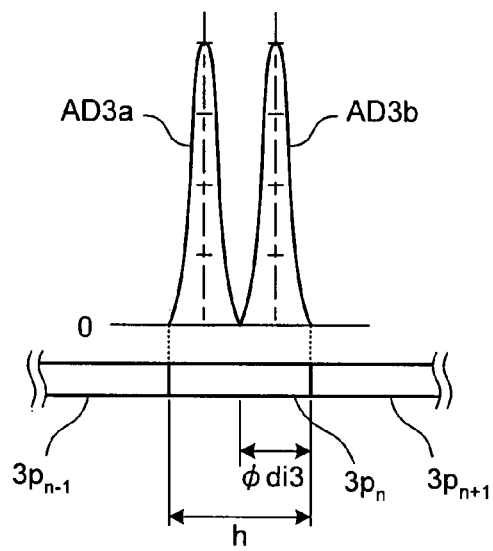
FIG. 3C is a diagram showing a light quantity distribution of the Airy disks when two Airy disks are included in a light receiving area of one pixel.

On the other hand, for example, as shown in FIG. 3C, a plurality of Airy disks are included in a light receiving area of one pixel, which makes it possible to further increase a quantity of light received and an electromotive current per pixel. However, in this case, it is impossible to distinguish between Airy disks corresponding to the respective light quantity distribution curves AD3a and AD3b. However, an object of the low-light specimen image pickup unit according to the present invention is, for example, not to carry out photometry so as to separate luminous pigments one-by-one, and provided that it is possible to substantially observe where the mass of luminous pigments during emission which distribute countlessly in the cell serving as the specimen 1 so as to be dense far than the limit of the resolution of the image pickup lens 2, is, it is possible to sufficiently achieve the object. In extreme cases, it suffices to merely know the shapes (existence) of the cells during emission, and be able to carry out photometry of a total quantity of luminescence from the cells. Therefore, a prescription of a size of a pixel of the CCD 3 with respect to an Airy disk is a provision for improving an S/N, and a parameter for obtaining a detectable depth of luminescence which will be described later.

Note that, as shown in FIG. 3C, in order for two adjacent Airy disks to be included in a width of the light receiving area of one pixel, as is clear from the equation (5), it suffices to make a power of the magnificent $M_g$ of the image pickup lens 2 half that in the case in which an Airy disk diameter and a size of a light receiving area in one pixel are made equal.

As described above, in the low-light specimen image pickup unit according to the embodiment 1, because the light from the respective point light sources on the specimen 1 is imaged so as to be telecentric onto the CCD 3 by the image pickup lens 2 with a high NA at the specimen side, and an Airy disk of a size approximately touching internally a light receiving area in a pixel, it is possible to receive the light at high sensitivity by substantially condensing low light from the point light sources into the pixel, which improves an S/N ratio. In accordance therewith, even with respect to the specimen 1 emitting low light such as a cell into which, for example, luciferase genes are introduced as luminous pigments, it is possible to take an image of the specimen in a short exposure time of about several minutes without photon counting by a cooled CCD at a relatively high temperature of about 0° C.

Note that the reason why the CCD 3 is set to a monochrome CCD is that, when the CCD 3 is set to, for example, a single-plate color CCD, a light receiving area having color filters of three primary colors of R, G, and B is provided to one pixel, which brings about a loss in a quantity of light received and a deterioration in resolution.

Figure 5:
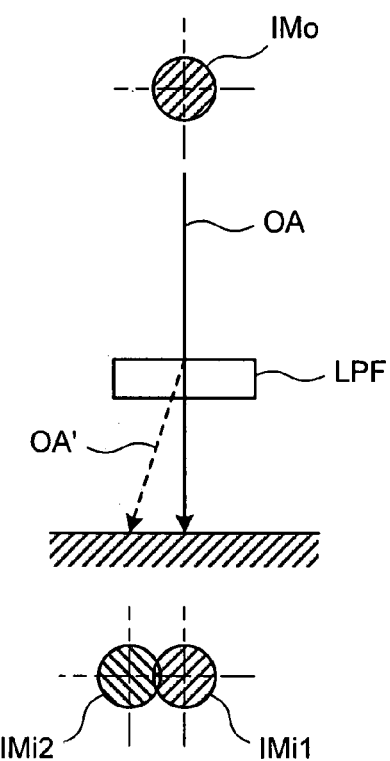
FIG. 5 is a diagram for explanation of a characteristic of an optical low-pass filter.

Further, when a CCD is used, usually, an optical low-pass filter is provided in front of an imaging area in order to prevent Moire fringes from being generated. However, in the low-light specimen image pickup unit according to the embodiment 1, no low-pass filter is provided. This is because an optical low-pass filter is, for example, as shown in FIG. 5, realized by a crystal filter LPF, and makes an optical axis OA' diverge from the optical axis OA, and prepares images IMi1 and IMi2 divided into two from an image Imo, which brings about a loss in a quantity of light received and a deterioration in resolution. Further, this is because there is no need to consider an effect by Moire fringes as described above in the low-light specimen image pickup unit according to the embodiment 1.

EMBODIMENT 2

Next, an embodiment 2 of the present invention will be described. In the embodiment 1 described above, an image of the specimen 1 is imaged on the imaging area 3a by the image pickup lens 2 serving as an integrated finite lens system. In the embodiment 2, an image of the specimen 1 is imaged by an infinite lens system formed from an objective lens and an imaging lens.

Figure 6:
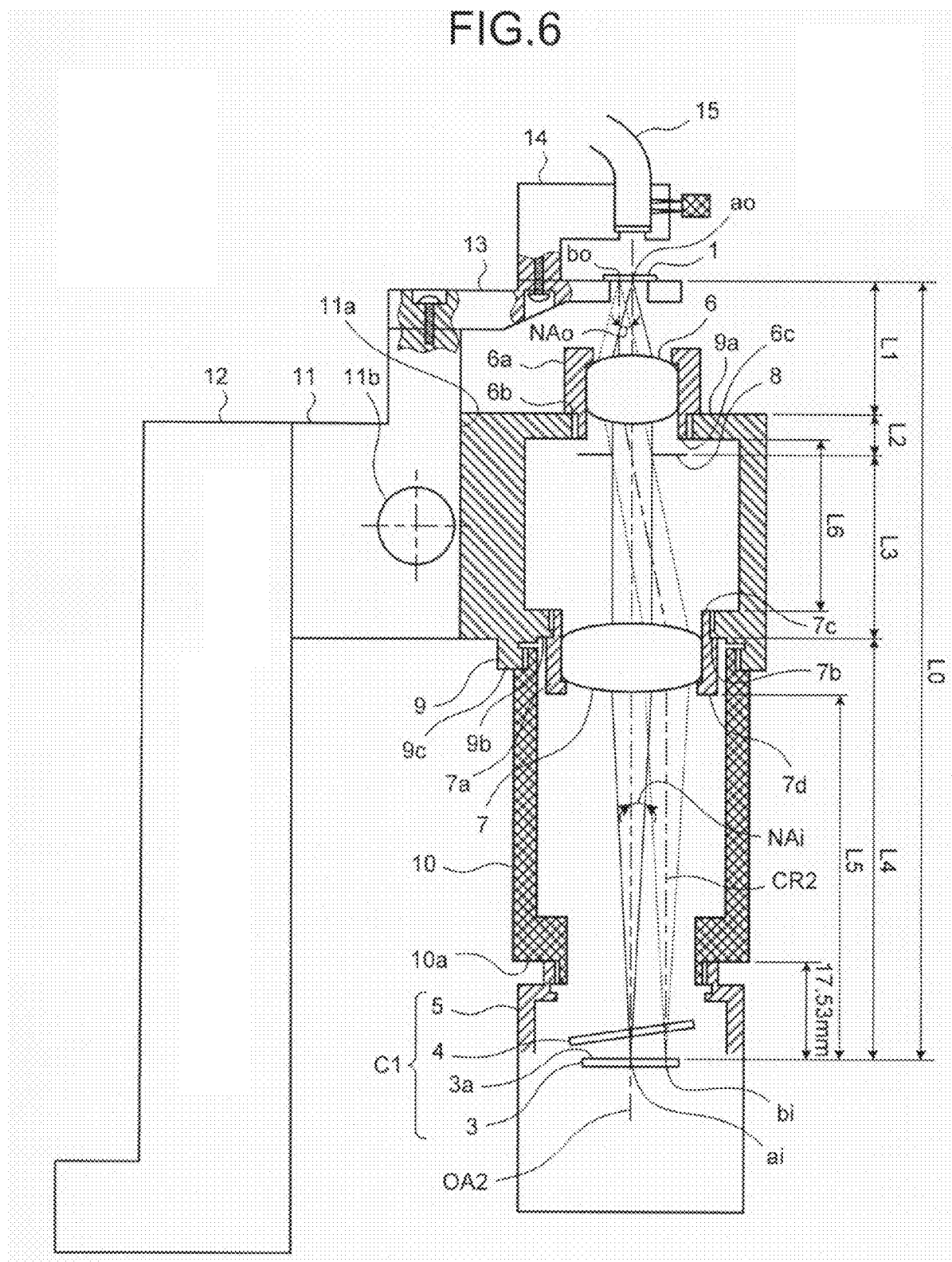
FIG. 6 is a diagram showing a structure of a low-light specimen image pickup unit and a low-light specimen image pickup apparatus according to an embodiment 2 of the present invention.

FIG. 6 is a schematic diagram showing a structure of a low-light specimen image pickup unit and a low-light specimen image pickup apparatus according to the embodiment 2 of the present invention. As shown in FIG. 6, the low-light specimen image pickup unit according to the embodiment 2 has an objective lens 6 and an imaging lens 7 serving as an imaging optical system, which are disposed along an optical axis OA2, the infrared light cut filter 4, and the CCD 3. Here, component parts which are the same as those in the embodiment 1 are denoted by the same reference numerals.

The objective lens 6 is held with caulking or the like by a lens-barrel 6a, and the lens-barrel 6a is attached to be fitted into an end face 9a of a lens-barrel 9 by screws, and the imaging lens 7 is held with caulking or the like by a lens-barrel 7a, and the lens-barrel 7a is attached to be fitted into an end face 9b of the lens-barrel 9 by screws. Further, a camera C1 having CCD 3, the infrared light cut filter 4 and the camera housing 5 is attached to be fitted into an end face 10a of a connecting lens-barrel 10 by screws and the connecting lens-barrel 10 is attached to be fitted into the end face 9a of the lens-barrel 9 by screws. Each of the lens-barrel 6a, the lens-barrel 7a, the connecting lens-barrel 10, and the camera C1 are detachable. Note that the camera C1 corresponds to the C-mount specification, and the imaging area 3a of the CCD 3 is allocated at a position by 17.53 mm along the optical axis OA2 from the end face 10a.

Further, the low-light specimen image pickup apparatus according to the embodiment 2 has the lens-barrel 9 holding the low-light specimen image pickup unit, a main body rack 11 holding the lens-barrel 9 so as to be movable along a slide plane 11a, a base rack 12 holding the main body rack 11, a specimen support 13 holding the specimen 1, an illumination fiber 15 serving as an illumination unit introducing an illumination light for illuminating the specimen 1, and an illumination rack 14 holding the illumination fiber 15. The illumination rack 14 is held by the specimen support 13, and the specimen support 13 is held by the main body rack 11.

A position of the lens-barrel 9 is adjusted vertically with respect to the drawing along the slide plane 11a parallel to the optical axis OA2 in accordance with a rotating operation of an operation dial 11b, and focusing of the objective lens 6 onto the specimen 1 is carried out in accordance therewith. Further, the illumination fiber 15 introduces an illumination light emitted from a light source such as an unillustrated white light source, and carries out bright visual field illumination serving as transmission illumination onto the specimen 1. Note that the illumination fiber 15 may carry out focal illumination at an angle inclined from the optical axis depending on a specimen.

Here, the imaging optical system formed from the objective lens 6 and the imaging lens 7 will be described. The objective lens 6 is a lens system corrected to be at infinity, and detects light from the respective point light sources on the specimen 1 focused on the anterior focal position of the objective lens 6 so as to be telecentric at a numerical aperture NA, and emits those respectively so as to be parallel beams. The respective parallel beams emitted from the objective lens 6 are condensed on an aperture stop 8 disposed at the posterior focal position of the objective lens 6 to form an exit pupil.

The imaging lens 7 is disposed such that the anterior focal position conforms to the exit pupil position on the aperture stop 8, and condenses the respective parallel beams which have passed through the aperture stop 8, and forms an image of the specimen 1 to be telecentric at a numerical aperture $NA_i$ on the observation area 3a of the CCD 3 perpendicular to the optical axis OA2. At that time, the imaging lens 7 forms an image of the specimen 1 so as to correct for spherical aberration, astigmatism, or the like brought about by the infrared light cut filter 4.

The objective lens 6 and the imaging lens 7 condense light from the point light sources ao and bo on the specimen 1, and forms images of the lights respectively onto the image points ai and bi on the imaging area 3a as shown in, for example, FIG. 6. At that time, a chief ray CR2 of the light imaged on the image point bi is made parallel to the optical axis OA2 by the imaging lens 7, and is incident into the imaging area 3a perpendicularly. In the same way, chief rays of the lights imaged on the respective points on the imaging area 3a other than the imaging point bi are made parallel to the optical axis OA2 by the imaging lens 7, and are incident into the imaging area 3a perpendicularly. Note that the telecentric image-formation by the objective lens 6 and the imaging lens 7 is not limited to a case in which the respective chief rays are made precisely parallel to the optical axis OA2, and includes a case in which those are made substantially parallel to the optical axis OA2.

Further, the imaging lens 7 is, in the same way as the image pickup lens 2 of the embodiment 1, forms an Airy disk in a size touching internally a light receiving area of a pixel on the imaging area 3a. Namely, the imaging lens 7 forms an image of a point light source on the specimen 1 onto the imaging area 3a such that an Airy disk diameter and a size of a light receiving area in a pixel are made substantially equal. In accordance therewith, in the low-light specimen image pickup unit according to the embodiment 2 as well, a quantity of light received and an electromotive current per one pixel are increased, and an S/N ratio is improved, which makes it possible to take images of the respective point light sources on the specimen 1 at high sensitivity.

The numerical aperture $NA_o$ of the objective lens 6 is desirably made to be about 0.7 or more. However, there is no need to interpret it as meaning of the limit to 0.7 or more, and for example, this can be 0.6. Further, the numerical aperture $NA_i$ of the imaging lens 7 is suitably made to be about 0.1 to 0.3, and in this case, given that a wavelength λ is 0.6 μm, an Airy disk diameter to be formed is made to be about 7.3 to 2.4 μm. Here, the imaging lens 7 preferably has an entrance pupil diameter of a size which is the same or more than the exit pupil diameter of the objective lens 6.

Further, the aperture stop 8 is attached to the lens-barrel 6a or the lens-barrel 9 by an unillustrated fixing member. Here, the aperture stop 8 is defined as a fixed aperture whose opening diameter is fixed. However, this may be a variable aperture whose opening diameter is variable, which makes it possible to change the numerical apertures $NA_o$ and $NA_i$. Note that the aperture stop 8 may be included in the objective lens 6.

Moreover, with respect to the imaging optical system formed from the objective lens 6 and the imaging lens 7, given that a magnification is $M_g$, the resolution on the specimen 1 is ϵ, the resolution on the imaging area 3a is L, and an Airy disk diameter formed on the imaging area 3a is $\phi d_i$, the equations (1) to (9) can be applied thereto in the same way as the image pickup lens 2.

Further, the objective lens 6 is detachable to the lens-barrel 9 by the lens-barrel 6a, and can be replaced with a replacement objective lens in which at least one of a focal length and a numerical aperture $NA_i$ is different in accordance with an observing condition or the like for the specimen 1. In the replacement objective lens, in order to provide a focal point which is the same as that of the objective lens 6, a distance L1 from an abutting joint face 6b which is a layout datum plane of the objective lens 6 to the anterior focal position, and a distance L2 from the abutting joint face 6b to the exit pupil position are respectively made substantially equal to those of the objective lens 6.

In the same way, the imaging lens 7 is detachable to the lens-barrel 9 by the lens-barrel 7a, and can be replaced with a replacement objective lens in which at least one of a focal length and a numerical aperture $NA_o$ is different in accordance with an imaging condition or the like onto the imaging area 3a. In the replacement objective lens, in order for the posterior focal position to conform to the imaging area 3a when the lens is attached to the lens-barrel 9, a distance L3 from an abutting joint face 7b which is a layout datum plane of the imaging lens 7 to the exit pupil position, and a distance L4 from the abutting joint face 7b to the posterior focal position are respectively made substantially equal to those of the imaging lens 7.

Moreover, a distance L5 from the end face 7d of the lens-barrel 7a to the imaging area 3a is made to be 17.53 mm or more in order for the camera C1 corresponding to the C-mount specification to be easily replaced. This distance L5 is maintained approximately fixed even when the imaging lens 7 is replaced with the replacement imaging lens.

Further, a distance L6 between the end face 6c of the lens-barrel 6a and the end face 7c of the lens-barrel 7a when the objective lens 6 and the imaging lens 7 are respectively attached to the lens-barrel 9, is preferably made to be about 20 mm or more in order for the various optical devices to be disposed therebetween. Further, in order to prevent that a distance L0 from the specimen 1 to the imaging area 3a is made too great, and the imaging lens 7 is made greater, which results in a high price, or a difficulty in the layout, this is preferably made to be about 70 mm or less. This distance L6 is maintained substantially fixed even when the objective lens 6 and the imaging lens 7 are respectively replaced with the replacement objective lens and the replacement imaging lens. The distance L6 may be 20 mm or less when it is not necessary to dispose optical devices therebetween.

In this way, in the low-light specimen image pickup unit and the low-light specimen image pickup apparatus according to the embodiment 2, it is possible to carry out image pickup at high sensitivity by forming an image of a point light source on the specimen 1 onto the imaging area 3a such that an Airy disk diameter and a size of a light receiving area in a pixel are made approximately equal; also, because an image of the specimen 1 is formed to be telecentric on the imaging area 3a by the imaging optical system corrected to be at infinity, which is formed from the objective lens 6 and the imaging lens 7, it is possible to easily replace at least one of the objective lens 6 and the imaging lens 7, and it is possible to easily change imaging conditions such as the numerical apertures $NA_o$ and $NA_i$, the Airy disk diameter $\phi d_i$, and the magnification $M_g$. Further, because it is possible to carry out transmission illumination of the specimen 1 by the illumination fiber 15, it is possible to observe a bright visual field image of the specimen 1.

Note that, in the low-light specimen image pickup apparatus shown in FIG. 6, focusing onto the specimen 1 is carried out by adjusting a position of the lens-barrel 9 along the slide plane 11*a*. However, because the imaging optical system formed from the objective lens 6 and the imaging lens 7 is a system corrected to be at infinity, which does not bring about a deterioration in the imaging performance even when the objective lens 6 is shifted forward or backward to a certain extent in the optical axis OA2 direction, focusing onto the specimen 1 may be carried out by adjusting a position of the objective lens 6.

Next, images actually taken by the low-light specimen image pickup unit and the low-light specimen image pickup apparatus according to the embodiment 2 are shown in FIGS. 7A to 7D. The images shown in FIGS. 7A to 7D are images of a specimen prepared such that luciferase genes "pGL3-control vector (manufactured by Promega Corporation.)" are introduced into a HeLa cell of human origin, and this is incubated for one day, and thereafter, this is rinsed out with a Hanks balanced salt solution, and is replaced with a Hanks salt solution including 1 mM of luciferin.

The lenses used as the objective lens 6 and the imaging lens 7 are commercially available objective lenses for microscope respectively specified as "Oil, 40×, NA1.0" and "5×, NA0.13", and a total magnification corresponding to the magnification $M_g$ of the imaging optical system is 8×. The camera used as the camera C1 is a cooled CCD camera for astronomical observation (manufactured by Santa Barbara Instrument Group, Inc.), which is cooled to be at 0° C., and the CCD element serving as the CCD 3 is a ⅔-inch type, and has a pixel count of 765×510, and is of a size of 9 μm-square.

Figure 7A:
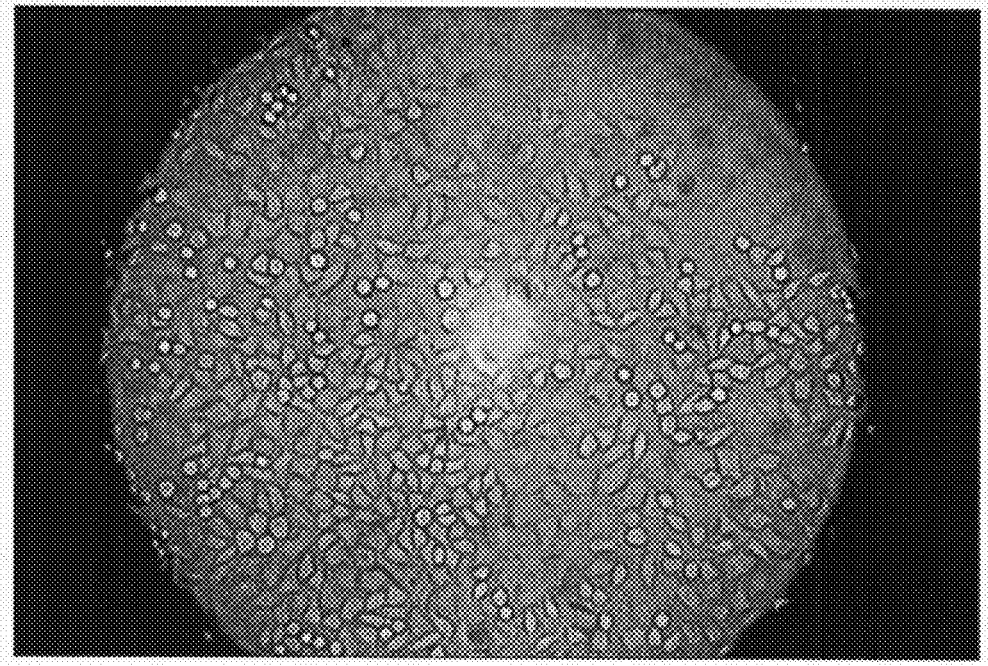
FIG. 7A is a diagram showing an image of a bright visual field image of a specimen taken by the low-light specimen image pickup unit and the low-light specimen image pickup apparatus shown in FIG. 6.
Figure 7B:
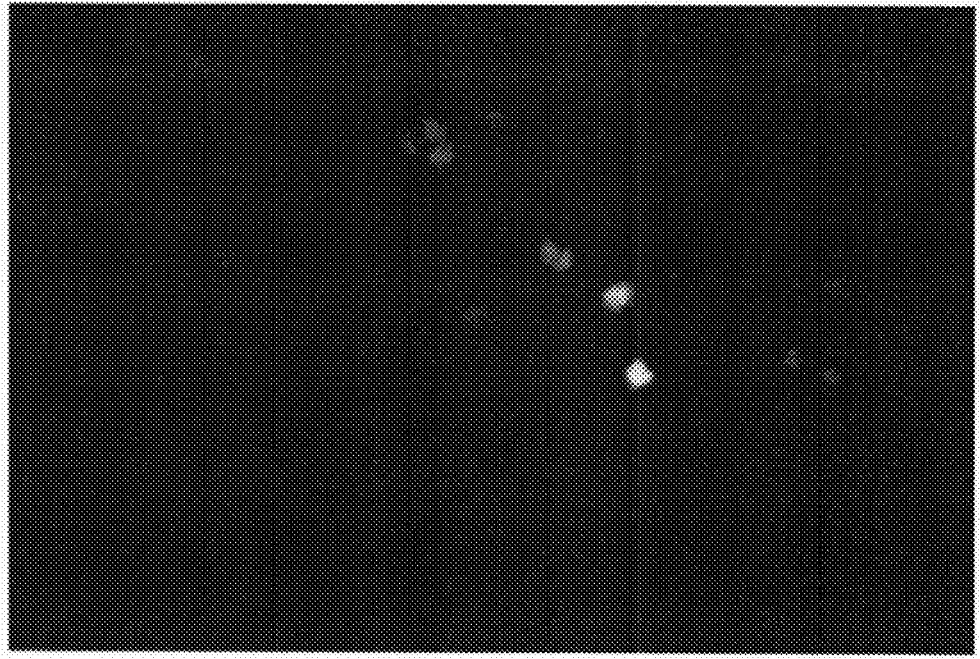
FIG. 7B is a diagram showing an image of a self-luminous image of a specimen exposed for one minute to be imaged by the low-light specimen image pickup unit and the low-light specimen image pickup apparatus shown in FIG. 6.
Figure 7C:
FIG. 7C is a diagram showing an image of a self-luminous image of a specimen exposed for five minutes to be imaged by the low-light specimen image pickup unit and the low-light specimen image pickup apparatus shown in FIG. 6.
Figure 7D:
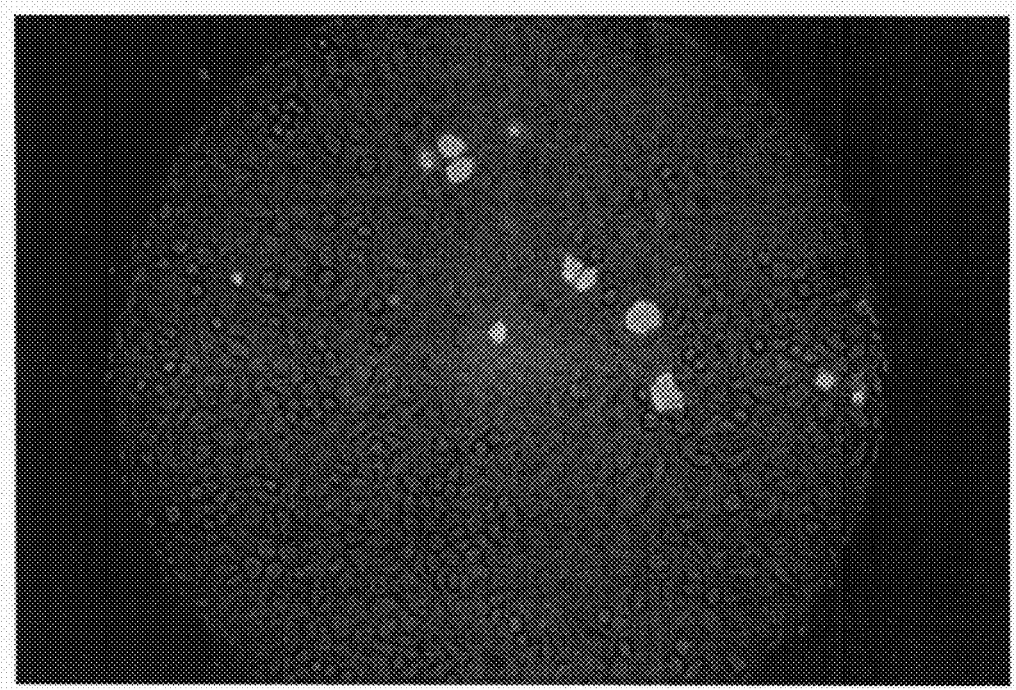
FIG. 7D is a diagram showing an image displayed such that the images shown in FIGS. 7A and 7C are superimposed onto one another.

FIG. 7A is an image that a bright visual field image of the specimen is taken, and FIGS. 7B and 7C are images that self-luminous images of the specimen are taken, and are images respectively exposed for one minute and five minutes to be imaged. FIG. 7D is an image displayed such that the two images shown in FIGS. 7A and 7C are superimposed onto one another.

As shown in FIG. 7B, in accordance with the low-light specimen image pickup unit and the low-light specimen image pickup apparatus according to the embodiment 2, it is possible to take an image of low light emitted from luciferase genes in a short exposure time of one minute without photon-counting even by a cooled CCD at a relatively high temperature which has been cooled to be at 0° C. Further, as shown in FIG. 7C, by setting an exposure time to five minutes, it is possible to take an image of luciferase genes emitting lower light. Moreover, as shown in FIG. 7A, it is possible to take a bright visual field image of a specimen, and as shown in FIG. 7D, it is possible to observe the positions of the luminous luciferase genes in the specimen, and to specify a cell including the luminous luciferase genes by superimposing the bright visual field image and the self-luminous image. Note that, in the Nonpatent Literature 1, as shown in FIG. 2 in this literature, an image of a specimen is taken to be mosaic-like, and it is extremely difficult to specify a luminous cell.

Moreover, as another example of the results of the experiment carried out by the low-light specimen image pickup unit and the low-light specimen image pickup apparatus according to the embodiment 2, an example of a time-lapse reporter assay in a single cell will be described.

Figure 8A:
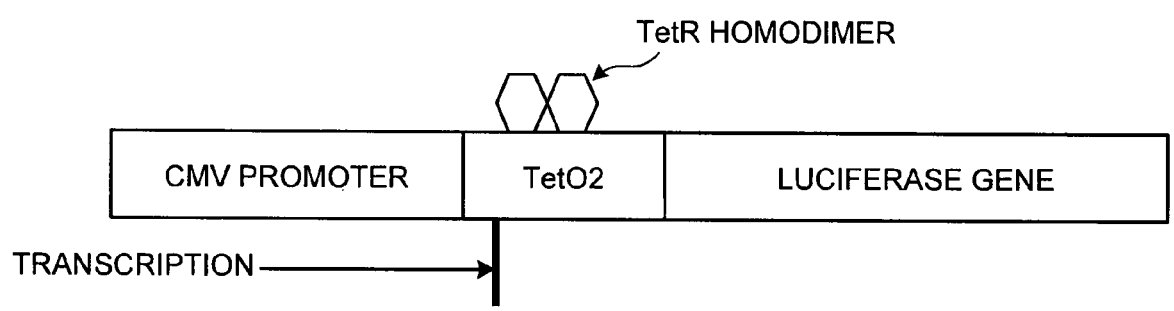
FIG. 8A is a diagram for explanation of a method for preparing a specimen for an experiment by the low-light specimen image pickup unit and the low-light specimen image pickup apparatus shown in FIG. 6.
Figure 8B:
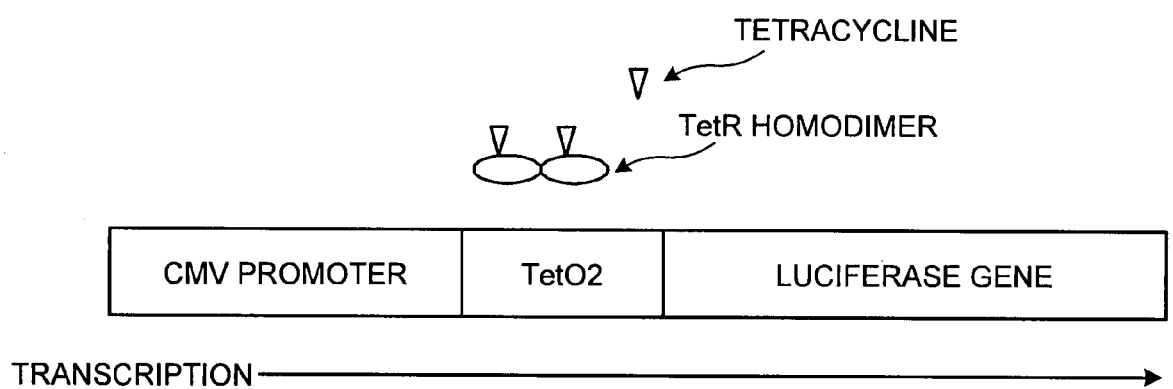
FIG. 8B is a diagram for explanation of a method for preparing a specimen for an experiment by the low-light specimen image pickup unit and the low-light specimen image pickup apparatus shown in FIG. 6.

In this reporter assay, first, a specimen is prepared such that a vector "pcDNA6/TR (manufactured by Invitrogen Corporation.)" constantly expressing tetracycline repressor (TetR), and a plasmid in which a luciferase gene is connected to an expression vector "pcDNA4/TO (manufactured by Invitrogen Corporation.)" having tetracycline operator (TetO2) are both expressed in a HeLa cell. In this state, as shown in FIG. 8A, since a TetR homodimer is coupled to a TetO2 area, transcription of a luciferase gene is suppressed. Next, as shown in FIG. 8B, tetracycline is added into a culture solution to be coupled to the TetR homodimer, and the conformation of the TetR homodimer is changed, which separates the TetR homodimer from the TetO2, and transcription of a luciferase gene is induced. Note that the culture solution is a D-MEM culture medium including HEPES of 10 mM, and includes luciferin of 1 mM.

The lenses used as the objective lens 6 and the imaging lens 7 are commercially available objective lenses for microscope which are respectively specified as "Oil, 20×, NA0.8" and "5×, NA0.13", and a total magnification corresponding to the magnification $M_g$ is 4× (an effective $NA_o$ of the objective lens=0.52). The camera used as the camera C1 is a digital camera for microscope "DP30BW (manufactured by OLYMPUS Corporation.) which is cooled to be at 5° C., and the CCD element serving as the CCD 3 is a ⅔-inch type, and has a pixel count of 1360×1024, and is of a size of 6 μm-square.

Figure 9A:
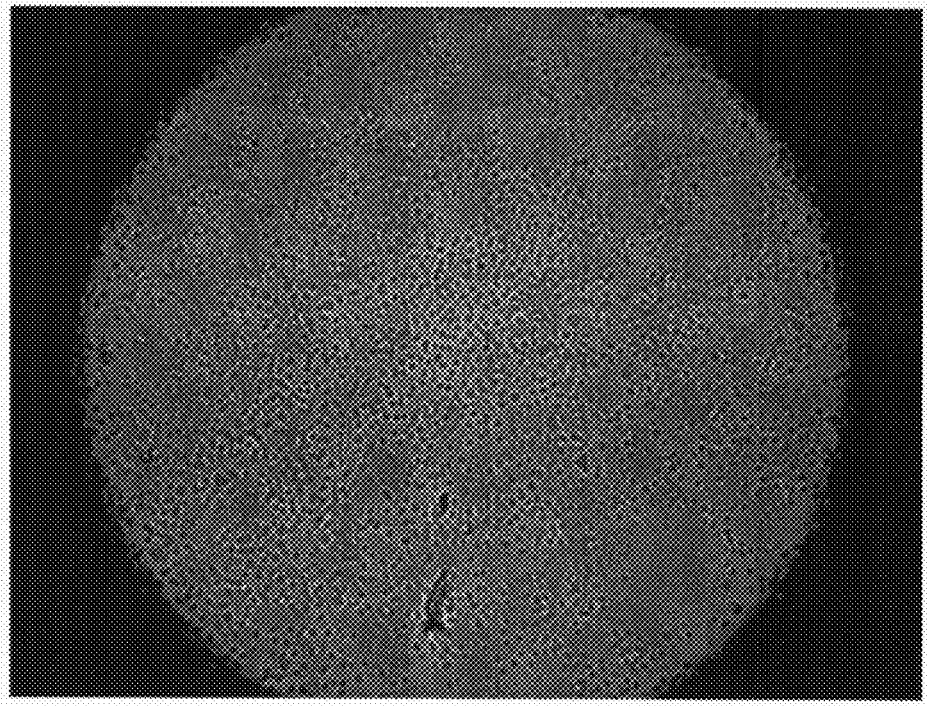
FIG. 9A is a diagram showing an image of a bright visual field image of a specimen taken by the low-light specimen image pickup unit and the low-light specimen image pickup apparatus shown in FIG. 6.
Figure 9B:
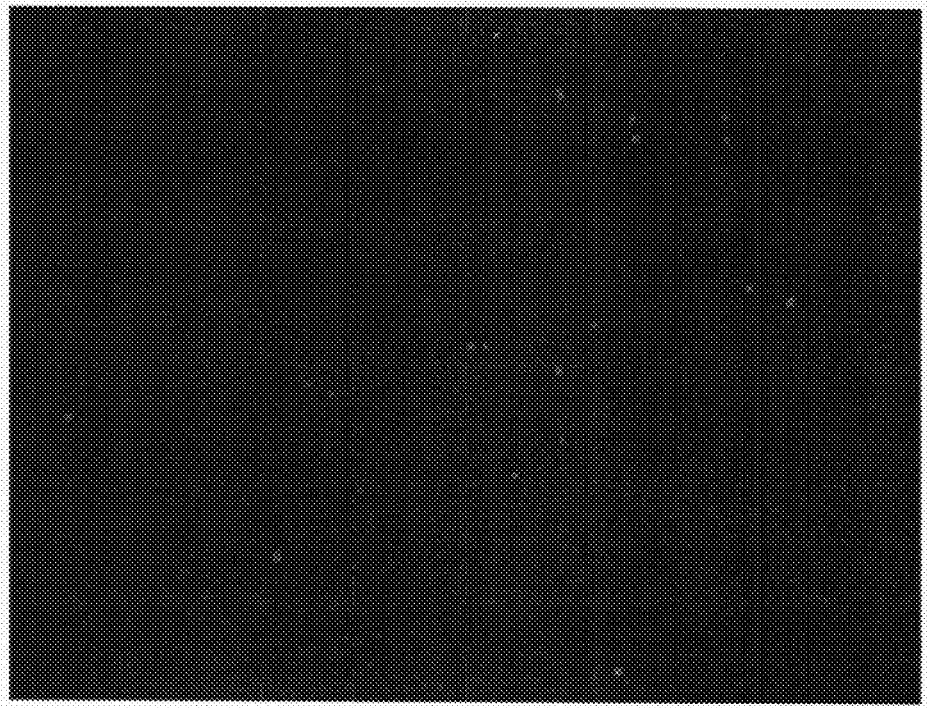
FIG. 9B is a diagram showing an image of a self-luminous image of a specimen exposed for one minute to be imaged by the low-light specimen image pickup unit and the low-light specimen image pickup apparatus shown in FIG. 6.
Figure 9C:
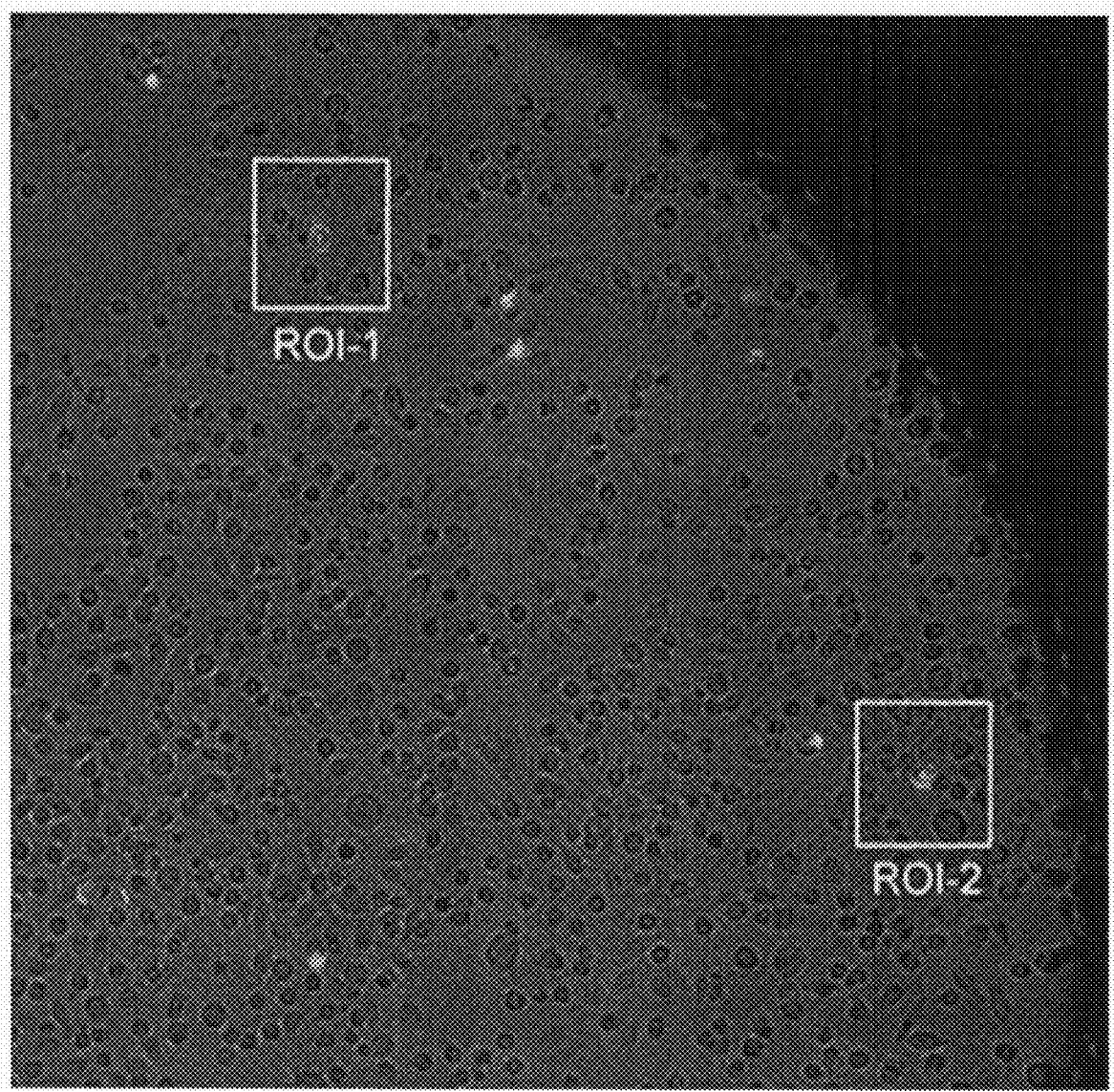
FIG. 9C is a diagram showing an image displayed such that the images shown in FIGS. 9A and 9B are superimposed onto one another so as to be enlarged.

FIG. 9A is an image of a bright visual field image of the specimen before tetracycline is added thereto. FIG. 9B is an image of a self-luminous image of the specimen after nine hours from when tetracycline is added thereto, which is exposed for one minute to be imaged. FIG. 9C is an image of the two images shown in FIGS. 9A and 9B superimposed onto one another, and a part thereof is displayed to be enlarged. Note that these observations have been carried out at a room temperature (25° C.). When a specimen is placed in an incubator, or when a part of or all of the image pickup unit or the image pickup apparatus is housed in the incubator, observation is possible under the circumstances at 37° C.

As shown in FIG. 9B, in accordance with the low-light specimen image pickup unit and the low-light specimen image pickup apparatus according to the embodiment 2, it is possible to take an image of low light emitted from luciferase genes in a short exposure time of one minute without photon-counting by a cooled CCD cooled to be at 5° C. Further, as shown in FIG. 9C, it is possible to observe the positions of the luminous luciferase genes in a sharp image, and to easily specify a cell including the luciferase genes by superimposing the bright visual field image and the self-luminous image. Therefore, it is possible to measure changes in a quantity of luminescence per one cell over time.

Figure 10:
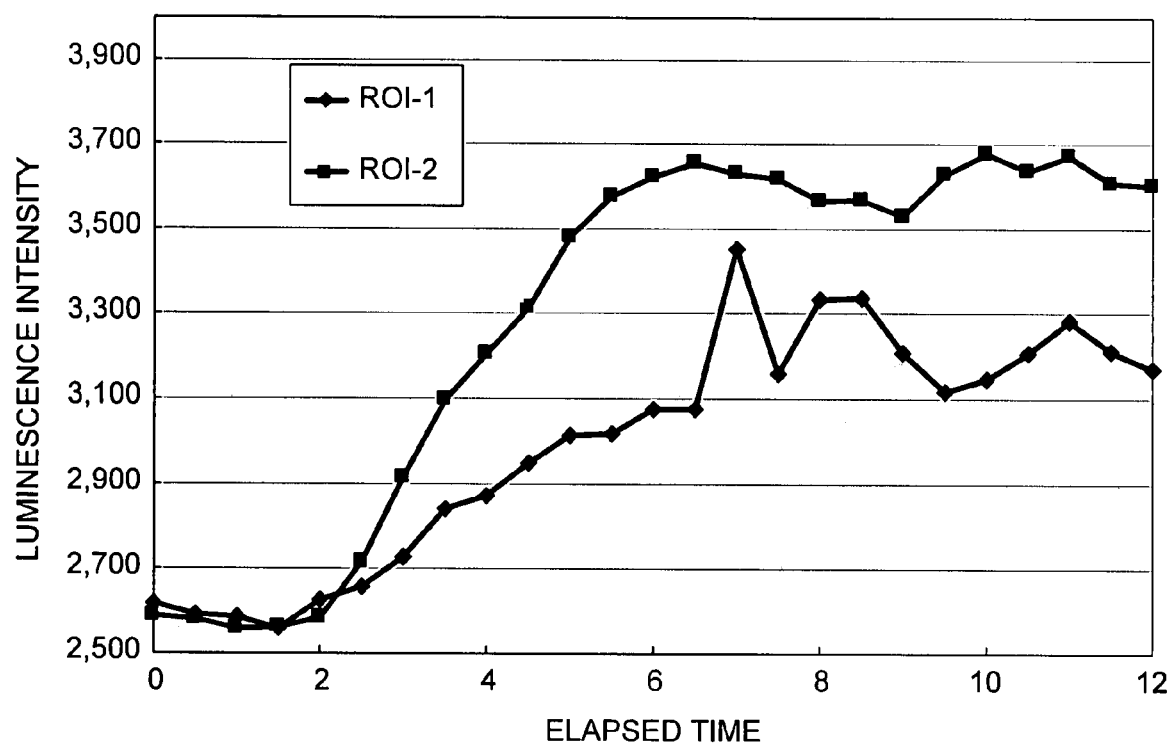
FIG. 10 is a graph showing results in which changes of luminescence intensities over time from a specimen corresponding to predetermined areas in the images shown in FIG. 9C are measured.

FIG. 10 is a graph showing results in which changes of luminescence intensities of the luciferase genes over time are measured with respect to areas ROI-1 and ROI-2 shown in FIG. 9C. FIG. 10 shows that the luminescence has been detected after two hours from when tetracycline is added thereto, and it has reached the plateau after 6 to 7 hours. In this way, in accordance with the low-light specimen image pickup unit and the low-light specimen image pickup apparatus according to the embodiment 2, it is possible to specify and track positions of luminous luciferase genes in time series, and to measure the time courses of luminescent phenomena.

Next, a relationship between an imaging magnification of the imaging optical system formed from the objective lens 6 and the imaging lens 7 and brightness of an image will be described. In theory, the focusing performance of the objective lens 6 in the imaging optical system is proportional to the square of the numerical aperture $NA_o$ at the specimen 1 side. Because the light quantity thereof is used for imaging, a total light quantity LQ relating to the imaging is shown by the following equation (10) regardless of the transmittance or the like of the imaging optical system.

$$LQ \propto NA_o^2 \quad (10)$$

Namely, a condensed light quantity of the objective lens 6 is proportional to $NA_o^2$, and the greater the $NA_o$ is, it is brighter.

On the other hand, when the imaging optical system forms a specimen image of the specimen 1 at the magnification $M_g$, a size of the specimen image is made to be a size of $M_g$ times of the specimen 1, and the brightness per unit area of the specimen image is proportional to $(1/M_g^2)$. Therefore, when a distribution of illuminants serving as point light sources in the specimen 1 is uniform, a light quantity $Q_0$ per unit area of the specimen image is expressed by the following equation (11).

$$Q \propto (1/M_g^2) \quad (11)$$

In accordance therewith, a quantity of light received $Q_A$ per pixel on the imaging area 3a is expressed by the following equation (12) because the area A is proportional to $d^2$ by use of a length d of a side of a pixel and an area A.

$$Q_A \propto d^2 \cdot (1/M_g^2) \quad (12)$$

Namely, the quantity of light received of this pixel is proportional to $d^2$, and is inversely proportional to $M_g^2$.

Further, a general optical system has the concept called a depth of focus. This is the concept that an object point distant in the optical axis direction from a focal position of an objective lens is formed as an object image on an image surface in substantially the same way as an object point on the focus. However, this concept means that it is possible to detect light from a luminous point distant from the focal position as well. Then, to simplify the explanation, supposing that luminous pigments are uniformly distributed in the thickness direction in the specimen 1, a light quantity when photometry is carried out such that a pinhole PH with a diameter of $\phi_d$ is placed on an image surface of the imaging optical system will be considered.

Figure 11:
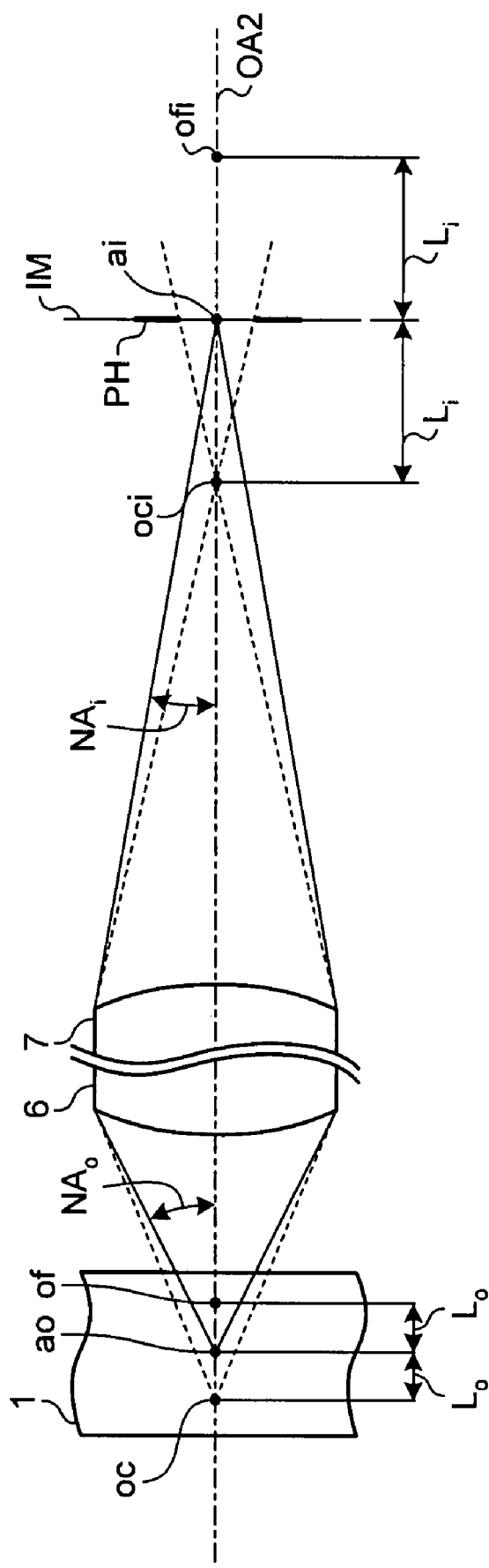
FIG. 11 is a diagram for explanation of an imaging status in a direction of depth of a specimen by the low-light specimen image pickup unit shown in FIG. 6.

As shown in FIG. 11, in the imaging optical system of the present embodiment 2, the point light source ao at the focal position of the objective lens 6 is formed as an image on the image surface IM. The point light source oc distant by a distance $L_o$ from the focal position of the objective lens 6 is formed as an image on an image point oci distant by a distance $L_i$ toward the imaging lens 7 side from the image surface IM. Because the axial magnification of the imaging optical system is expressed by $M_g^2$ by use of the magnification $M_g$, the distance L1 is expressed by the following equation (13) by use of the distance $L_o$.

$$L_i = L_o \cdot M_g^2 \quad (13)$$

Further, because the numerical aperture $NA_i$ at the exit side of the imaging lens 7 is a very small value, and the positions of the image point oci and the image point ai are different only slightly from each other, the numerical aperture $NA_i$, the distance $L_i$, and the pinhole diameter $\phi_d$ are in a relationship expressed by the following equation (14).

$$L_i \cdot NA_i = \phi_d/2 \quad (14)$$

To summarize the equation (14) with respect to the distance $L_o$ by use the equation (13), a relationship expressed in the following equation (15) is obtained.

$$L_o = (\phi_d/2) \cdot \{1/(M_g^2 \cdot NA_i)\} \quad (15)$$

Moreover, by use of the following equation (16) serving as a general equation showing a relationship between a magnification and a numerical aperture, the equation (15) is modified as shown in equation (17).

$$NA_i = NA_o/M_g \quad (16)$$

$$L_o = (\phi_d/2) \cdot \{1/(M_g \cdot NA_o)\} \quad (17)$$

Here, as shown in FIG. 11, there is no case in which, when the lights from the point light sources oc and of within the distance $L_o$ in the anteroposterior direction from the focal position are formed as images by the imaging lens 7 after being condensed by the objective lens 6, those are eclipsed by the pinhole PH. Namely, it is possible to carry out photometry without eclipsing the lights from the point light sources within the distance $L_o$ in the anteroposterior direction from the focal position by the pinhole PH. In this way, provided that a depth at the specimen side at which it is possible to carry out photometry without eclipse by the pinhole PH or the like on the image surface IM is defined as a detectable depth of luminescence (D•D•O•L: Detectable Depth of Luminescence), this detectable depth of luminescence $L_d$ is expressed by the following equation (18) by use of the equation (17).

$$L_d = 2L_o = \phi_d \{1/(M_g \cdot NA_o)\} \quad (18)$$

Note that, because some of the lights from the point light sources out of the detectable depth of luminescence $L_d$ as well can be taken into, an actual quantity of light received via the pinhole PH changes as shown in FIG. 12 in accordance with a depth at the specimen side. In FIG. 12, the intensity of light received at each depth at the specimen side is shown as a graph, and an actual quantity of light received is made to be a value obtained by integration of the graph. It can be understood from this FIG. 12 that the detectable depth of luminescence $L_d$ is about $3L_o$. However, this is not taken into consideration here.

In a specimen in which illuminants (for example, luminous pigments) are distributed uniformly at a density ρ in the thickness direction as well, a quantity of light received TQ of the combination of the numerical aperture $NA_o$ at the specimen side, the magnification $M_g$ of the imaging optical system, and the pinhole diameter $\phi_d$ on the image surface IM can be thought of the product of the equations (10), (12), and (18), which is expressed by the following equation (19).

$$TQ \propto NA_o^2 \cdot (1/M_g^2) \cdot \phi_d^3 \cdot \rho\{1/(M_g \cdot NA_o)\} = \phi_d^3 \cdot NA_o \cdot \rho/M_g^3 \quad (19)$$

The meaning of the equation (19) results in that the quantity of light received TQ is proportional to the cube of the pinhole diameter $\phi_d$ and the numerical aperture $NA_o$ at the specimen side, and is inversely proportional to the cube of the magnification $M_g$. Namely, because the contribution of the magnification $M_g$ is extremely high from the standpoint of photometry, to conclude here, the magnification $M_g$ of the imaging optical system is preferably made as small as possible. The pinhole diameter $\phi_d$ has been already determined from the relationship with an Airy disk diameter.

Here, comparison of light quantities when the objective lens 6 specified as "20×, f10 mm, $NA_o$ 0.8" is used, and a focal length of the imaging lens 7 is set to 200 mm (the total magnification is 20×) and 40 mm (the total magnification is 4×) is carried out. First, given that the pinhole diameter $\phi_d$, the numerical aperture $NA_o$, and the density $\rho$ in the equation (19) are constant, a quantity of light received $TQ_{20}$ when a total magnification is 20× is expressed by the following equation (20).

$$TQ_{20} \propto 1/20^3 = 1/8000 \qquad (20)$$

Further, a quantity of light received $TQ_4$ when a total magnification is 4× is expressed by the following equation (21) in the same way.

$$TQ_4 \propto 1/4^3 = 1/64 \qquad (21)$$

A ratio $TQ_4/TQ_{20}$ thereof is expressed by the following equation (22).

$$TQ_4/TQ_{20} = 125 \qquad (22)$$

Namely, when a total magnification is 4×, brightness which is 125 times as bright as that when a total magnification is 20× is obtained. Further, in the same way, when total magnifications are 2× and 8×, the brightness which is 100 times and 60 times as bright as that when a total magnification is 20× is obtained.

Next, resolution and brightness of the low-light specimen image pickup unit will be described. The resolution of the imaging optical system basically depends on the numerical aperture $NA_o$ at the specimen side of the objective lens 6, and does not relate to the focal length of the imaging lens 7. However, in the CCD 3 or the like, when a light receiving unit has a given area, the resolution (the power of expression of image) is deteriorated depending on a size of this area. Because an optimum size of a pixel of the CCD 3 from the standpoint of photometry has been already described, it will be not described here again. However, because a size of one side of a pixel of the CCD 3 used in the low-light specimen image pickup unit is greater than or equal to four times as large as a pixel size necessary for the resolution, it was experimented how the specimen actually appears in what resolution and how bright on the monitor.

Figure 13A:
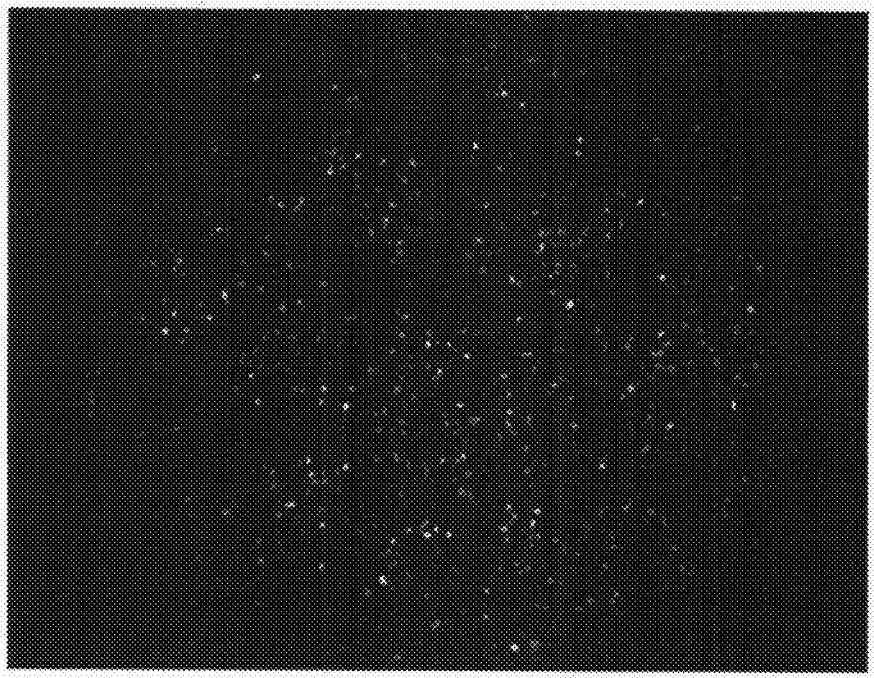
FIG. 13A is a diagram showing an image of a specimen image with low light taken by the low-light specimen image pickup unit whose total magnification is 2-powered.
Figure 13B:
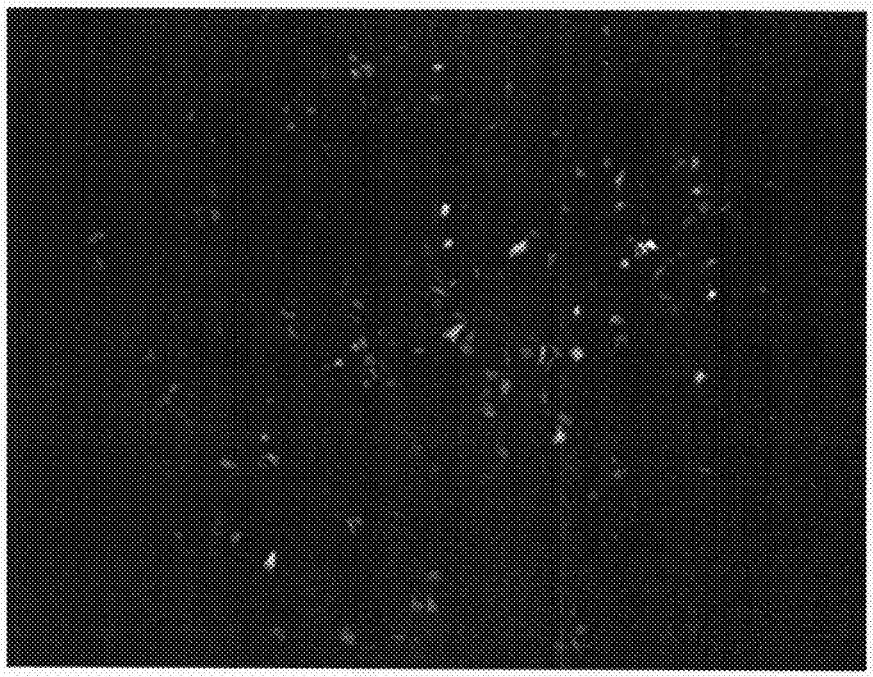
FIG. 13B is a diagram showing an image of a specimen image with low light taken by the low-light specimen image pickup unit whose total magnification is 4-powered.
Figure 13C:
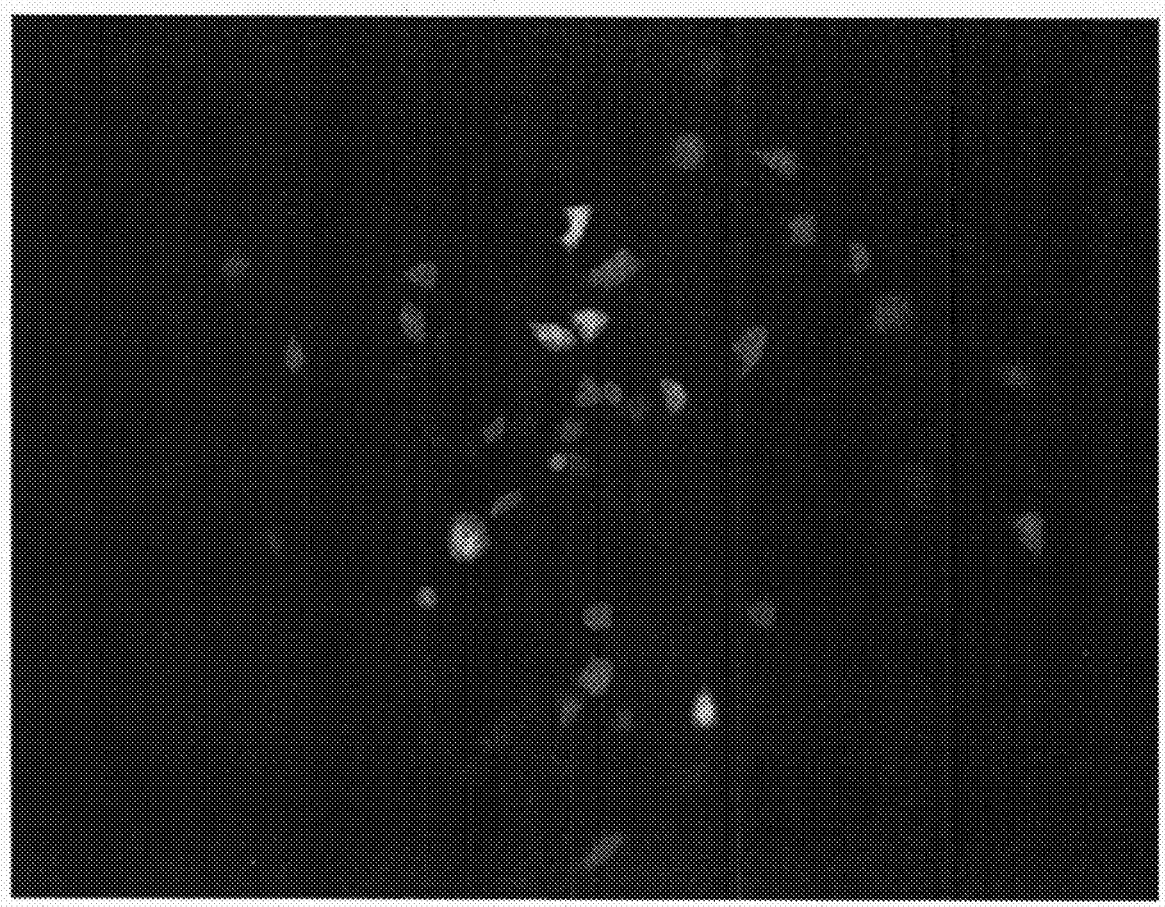
FIG. 13C is a diagram showing an image of a specimen image with low light taken by the low-light specimen image pickup unit whose total magnification is 8-powered.

In the experiment, as the imaging lens 7, an objective lens for microscope specified as "f40 mm, NA0.13" was used, and as the objective lens 6, an objective lens for microscope specified as "Uapo 40×, NA1.35, f5 mm", an objective lens for microscope specified as "Uapo 20×, NA0.75, f10 mm", and an objective lens for microscope specified as "Uapo 10×, NA0.40, f20 mm" were respectively used in the cases of 8× total magnification, 4× total magnification, and 2× total magnification. Here, because an NA of the imaging lens 7 is 0.13, an effective NA of the objective lens 6 is 1.04 (=0.13×8) in a case where Uapo is 40×, and is 0.52 (=0.13×4) in a case where Uapo is 20×, and is 0.26 (=0.13×2) in a case where Uapo is 10×. Further, as the camera C1, "DP30BW (OLYMPUS Corporation.)" whose size of a CCD pixel is 6 μm-square, was used. In accordance therewith, an image of a specimen in the same way as that in the experiment whose results are shown in FIGS. 7A to 7D was taken for an exposure time of five minutes. The results are shown in FIGS. 13A to 13C.

Based on the results, supposing that a size of a cell in the specimen is about a size touching internally a circle of about 25 μm, the appearance quality in image quality and the brightness of the image were considered in the respective cases of the 2×, 4×, and 8× total magnifications. The results thereof are together shown in FIG. 14. Note that, in FIG. 14, numbers of pixels of the CCD required for the image pickup are described therewith as reference.

When a ratio of the brightness of the images (the quantities of light received by pixels of the CCD 3) is calculated in the cases of the 8×, 4×, and 2× total magnifications by use of the equation (19) in the same way as that by the equation (22), it is expressed by the following equation (23) by use of the effective NA of the objective lens 6 supposing that the sizes of the CCDs are the same.

$$\begin{aligned} TQ_8 : TQ_4 : TQ_2 &= 1.04/8^3 : 0.52/4^3 : 0.26/2^3 \qquad (23) \\ &= 1.04/512 : 0.52/64 : 0.26/8 \\ &= 4/64 : 2/8 : 1/1 \\ &= 1/16 : 1/4 : 1 \\ &= 1 : 4 : 16 \end{aligned}$$

Here, $TQ_8$, $TQ_4$, and $TQ_2$ respectively show the quantities of light received in the cases of the 8×, 4×, and 2× total magnifications. By the thought of an appropriate magnification suitable for a purpose in consideration of the calculated values, the following can be established. Namely, the 2× total magnification is suitable for a case in which an attempt is made to carry out photometry of the entire cell regardless of the cell shape in a broad visual field, and the 8× total magnification is suitable for a case in which photometry is carried out so as to observe an outline of a cell even in darkness, and the 4× total magnification is suitable for a case of the use for all-purposes on neither side of being 2× and 8×.

In conclusion, the imaging magnification $M_g$ of the imaging optical system in the low-light specimen image pickup unit is preferably a substantially 2 magnifications to a substantially 8 magnifications from the standpoint of an appearance quality and the brightness of an image, and for the purpose of observing an image and carrying out photometry, one-power or less magnification is out of the purpose from the standpoint of an appearance quality of an image, and in a case of 10× or more magnification, defects are brought about in a photometric time or the like unless a specimen is especially bright.

Such a conclusion has been brought about from the experiment, and further, a detectable depth of luminescence calculated from the equation (18) was considered. First, total magnifications, detectable depths of luminescence, depths of focus (D•O•F: Depth of Focus) in various combinations when objective lenses for microscope were used as the objective lens 6 and the imaging lens 7 in the imaging optical system are shown in FIG. 15. A depth of focus $F_d$ is expressed by the following equation (24) given that a wavelength $\lambda$ is 0.6 μm. In FIG. 15, a depth ($2F_d$) that the anteroposterior depths of focus $F_d$ in the optical axis direction are added to one another is shown as a depth of focus.

$$F_d = \lambda/(2 \cdot NA_o^2) = 0.3/NA_o^2 \qquad (24)$$

Here, from the standpoint of a detectable depth of luminescence and a depth of focus, the imaging optical system of the low-light specimen image pickup unit is preferably structured as follows. First, because light quantities of cells in the optical axis directions before and after the objective cell are detected when a detectable depth of luminescence is too large for a thickness of a cell serving as a specimen, a detectable depth of luminescence is preferably made to be less than or equal to about ⅓ of a thickness of the cell. With respect to the Hela cell considered in the present invention, the diameter thereof is about 25 μm, and the thickness thereof is about 10

μm on a slide glass. Secondly, a detectable depth of luminescence is preferably made to be double or more of a depth of focus. This is because point light sources in a depth of focus are observed as images, but are taken as dark images.

In FIG. 15 in consideration thereof, in a case of an objective lens of "Dry, 20×", a total magnification is preferably less than or equal to 8×, and in a case of an objective lens of "Oil, 40×", a total magnification is preferably less than or equal to 16×. Further, because the magnification $M_g$ in the equation (18) is a total magnification of the imaging optical system, this can be paraphrased as follows. Namely, from the standpoint of a detectable depth of luminescence, in the imaging optical system, a numerical aperture $NA_o$ is preferably greater than or equal to 0.8, and a total magnification is preferably less than or equal to 8×. However, a numerical aperture $NA_o$ is not necessarily limited to be greater than or equal to 0.8, and for example, even when it is greater than or equal to 0.6, there is no problem in actual use.

Next, there is a request to realize a visual field as broad as possible. Generally, a visual field of the optical system of a microscope is much broader than a visual field number specified for a microscope. In the sense that an optical aberration and uniformity in illumination intensities on an image surface are maintained, an aperture is provided in front of an eyepiece, and a visual field is specified thereby. The imaging optical system of the low-light specimen image pickup unit of the present invention as well will be described by use of the same viewpoint.

A visual field number in a general microscope is about 24, and a visual field (effective visual field) $FN_{OB}$ of an objective lens is expressed by the following equation (25) by use of a magnification $M_{OB}$ of the objective lens.

$$FN_{OB}=24/M_{OB} \quad (25)$$

At that time, given that the total magnification $M_g$ of the imaging optical system is 4× on the basis of the above-described discussion, a visual field $FN_{OBI}$ at the imaging side is expressed by the following equation (26).

$$FN_{OBI}=(24/M_{OB})\cdot M_g=96/M_{OB} \quad (26)$$

Because the low-light specimen image pickup unit of the present invention captures an image by the CCD, an attempt is made to satisfy the point that a size of an image surface (visual field number) is ⅔ inches (an imaging area is 8.8×6.6 mm, a width across corners is 11 mm), and ½ inches (an imaging area is 6.4×4.8 mm, a width across corners is 8 mm). In contrast thereto, a visual field number $FN_{OBI10}$ when the magnification $M_{OB}$ of the objective lens 6 is made to be 10×, is expressed by the following equation (27) on the basis of the equation (26).

$$FN_{OBI10}=96/10=9.6 \quad (27)$$

This value brings about eclipses on the four corners in a ⅔-inch CCD, but satisfies a ½-inch CCD. However, when an objective lens for a microscope is used as the 10× objective lens, the following problem relating to a numerical aperture is brought about.

From the equation (19) determining a quantity of light received of CCD pixels, in the low-light specimen image pickup unit, an attempt is made to make the numerical aperture $NA_o$ of the objective lens 6 greater from the standpoint of placing importance on photometry. By the way, with respect to the numerical aperture $NA_o$ of a general objective lens of a microscope, because of, in addition to the limit due to a refractive index of a material physically provided between a specimen and the objective lens, the necessity of a WD (Working Distance) from the standpoint of usability, the numerical aperture $NA_o=0.9$ is a maximum in a case of a dry-objective lens (inclusion is air; a refractive index na=1.0), and the numerical aperture $NA_o=1.4$ is a maximum in a case of an oil-objective lens (inclusion is oil; a refractive index no=1.5).

Further, as factors regulating a numerical aperture of an objective lens of a microscope, in addition to the above-description, there are a fixing screw (20. 32thread36) for fixing the objective lens to a revolver of the microscope, and a size of the pupil of the objective lens. The pupil of the objective lens is disposed in the vicinity of the fixing screw, and a pupil diameter dp thereof is calculated by the following expression (28) by use of a numerical aperture $NA_o$ and a focal length f.

$$d_p=2\cdot NA_o\cdot f \quad (28)$$

Therefore, when a wall thickness of glass frame onto which the fixing screw is worked is set to be about 2 mm, it is necessary to suppress the pupil diameter $d_p$ to about 16 mm to a maximum. The maximum $NAs_o$ of the various objective lenses are structured as shown in FIG. 16 in accordance with this limit.

In conclusion, as 10× and 20× objective lenses, it is impossible to design lenses whose numerical apertures $NA_o$ for the use for microscope. Then, as the objective lens 6 of the imaging optical system, in a case of a dry-objective lens, a 20× objective lens whose $NA_o$ is the maximum is selected, and in a case of an oil-objective lens, because a numerical aperture $NA_o$ is suppressed to 1.4 even when a magnification is increased, and because a visual field is made smaller inversely when a magnification is made higher, a 40× objective lens of the minimum magnifications in which a visual field number is maximized is selected.

From the above-described results, when existing objective lenses for microscope are used for the imaging optical system of the low-light specimen image pickup unit, in a case of using a dry-objective lens, it is preferable that the objective lens 6 is specified to be "20×, $NA_o0.8$, f10 mm", the imaging lens 7 is specified to be "$NA_i0.2$, f40 mm", a total magnification is 4×, a diameter of an effective visual field on a specimen is 1.2 mm, and a visual field number on the CCD 3 is 4.8. Further, in a case of using an oil-objective lens, it is preferable that the objective lens 6 is "40×, $NA_o1.4$, f5 mm", the imaging lens 7 is "$NA_i0.35$, f20 mm", a total magnification is 4×, a diameter of an effective visual field on a specimen is 0.6 mm, and a visual field number on the CCD 3 is 2.4.

Here, the "$NA_i0.35$, f20 mm" serving as the imaging lens 7 is not only a high price in manufacturing, but also has a little visual field number, and a dry-objective lens of "$NA_i0.2$, f40 mm" may be applied. In this case, a total magnification is 8×, and a visual field number is 4.8, which makes an image darker slightly. However, it is possible to carry out sharp observation.

Figure 26:
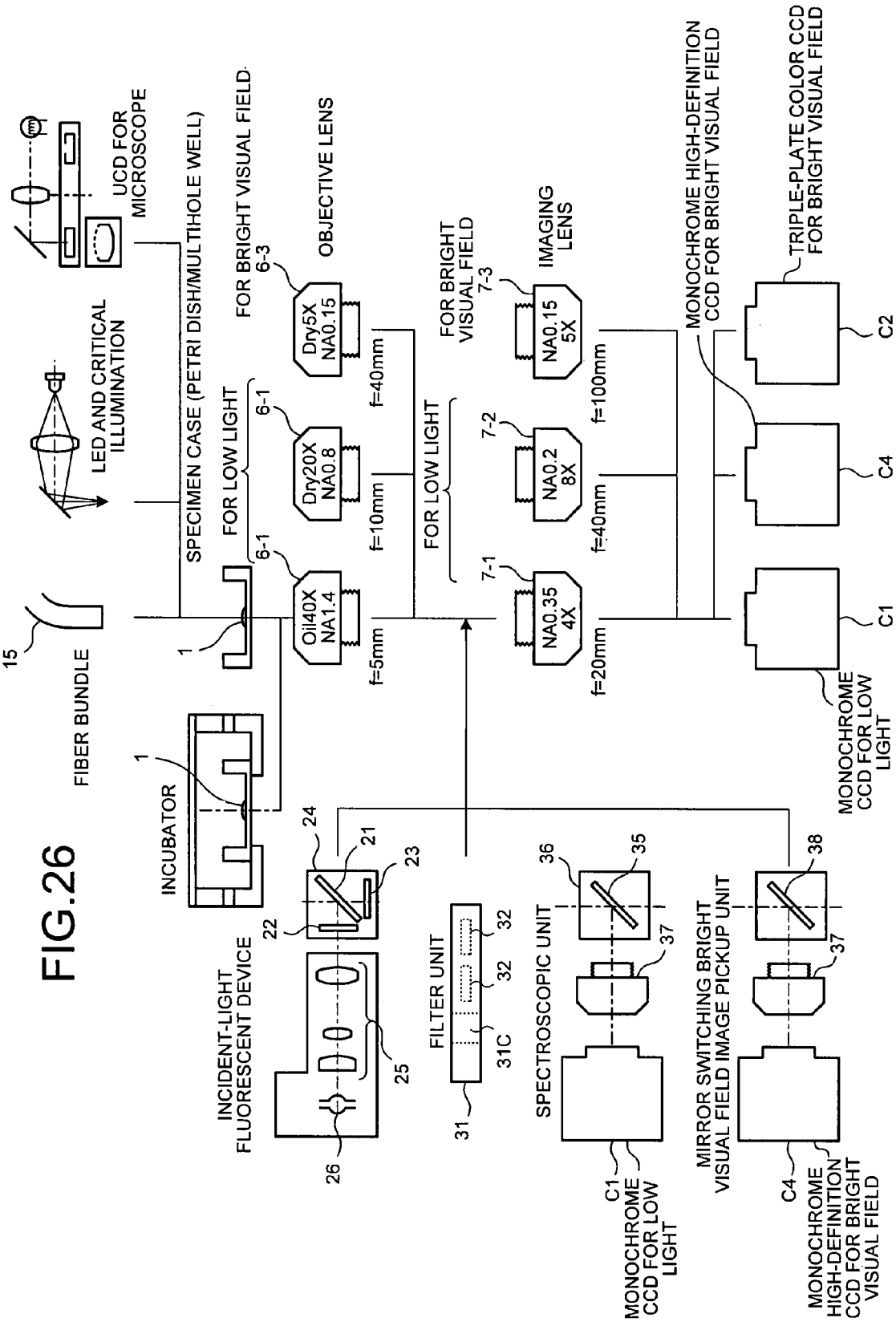
FIG. 26 is a diagram systematically showing structures of the respective units which can be applied to the low-light specimen image pickup unit and the low-light specimen image pickup apparatus shown in FIG. 6.
Figure 28:
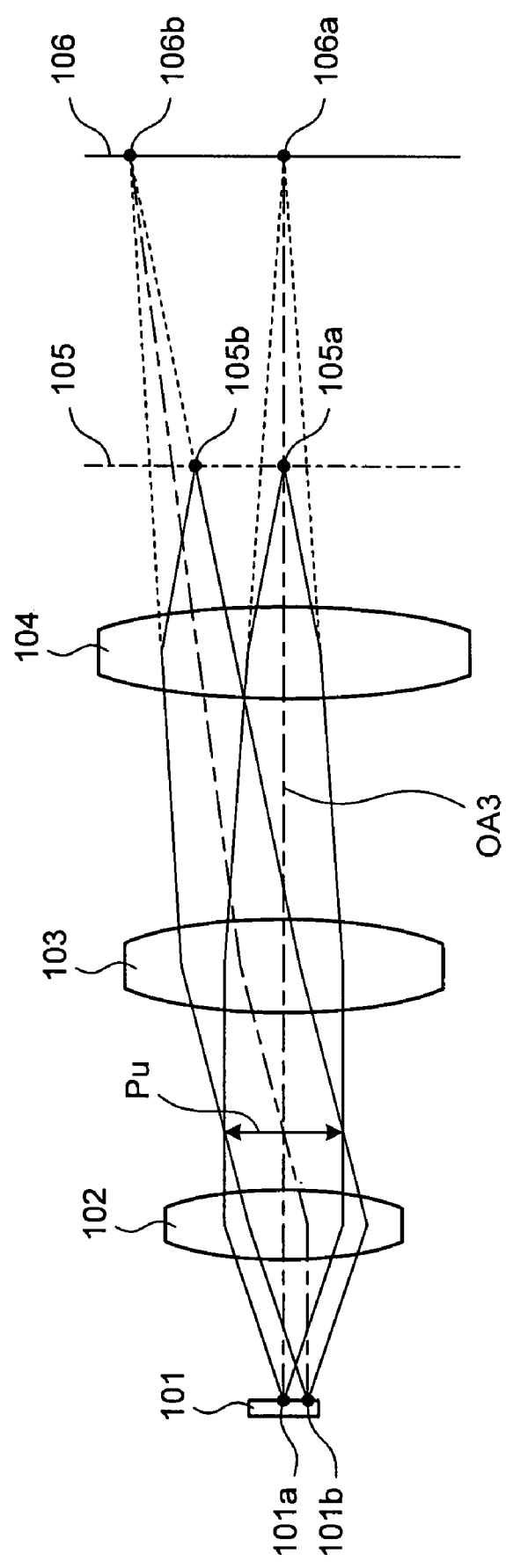
FIG. 28 is a diagram showing one example of an imaging optical system telecentric to an image side in which a reduction-powered lens is disposed.

Note that, for the above-described reasons, an optimum optical structure when the objective lenses for microscope of the low-light specimen image pickup unit shown in FIG. 26 are used, is determined. However, a numerical aperture $NA_o$ is not limited to be greater than or equal to 0.8, and may be greater than or equal to 0.6 for example. Details of FIG. 26 will be described later.

When the fixing screw to the revolver of the objective lens 6 is made greater, and a lens is newly prepared, by specifying it as follows, it is possible to increase a visual field number while maintaining the brightness and the resolution considered in the lenses for microscope, and for example, it is possible to eliminate the eclipses on an imaging area of the CCD in a ½-inch CCD. Namely, when a dry-objective lens is used, the objective lens 6 is specified to be "10×, $NA_o0.8$, f20 mm", the imaging lens 7 is specified to be "$NA_i0.2$, f80 mm", a total magnification is 4×, a diameter of an effective visual field on a specimen is 2.4 mm, and a visual field number on the CCD 3 is 9.6. Further, when an oil-objective lens is used, the objective lens 6 is specified to be "20×, $NA_o1.4$, f10 mm", the imaging lens 7 is specified to be "$NA_i0.2$, f80 mm", a total magnification is 8×, a diameter of an effective visual field on a specimen is 2.4 mm, and a visual field number on the CCD 3 is 9.6. However, an effective numerical aperture of the imaging lens 7 is 0.175. In accordance therewith, the lenses are made greater and high-priced. However, this can be an optimum optical system for the low-light specimen image pickup unit.

As described above, by making the numerical apertures of the imaging optical system of the low-light specimen image pickup unit greater, and by making the total magnification less, the brightness of the image is increased, and the detectable depth of luminescence is made deeper, which makes it possible to detect lights from the point light sources distant from the focal position of the objective lens, which results in a great increase in a quantity of light received of the CCD pixels.

By the way, in the low-light specimen image pickup unit and the low-light specimen image pickup apparatus according to the embodiment 2, because the imaging optical system formed from the objective lens 6 and the imaging lens 7 is a system corrected to be at infinity, various optical elements can be disposed between the objective lens 6 and the imaging lens 7, which makes it possible to observe the specimen 1 in various ways.

Figure 17:
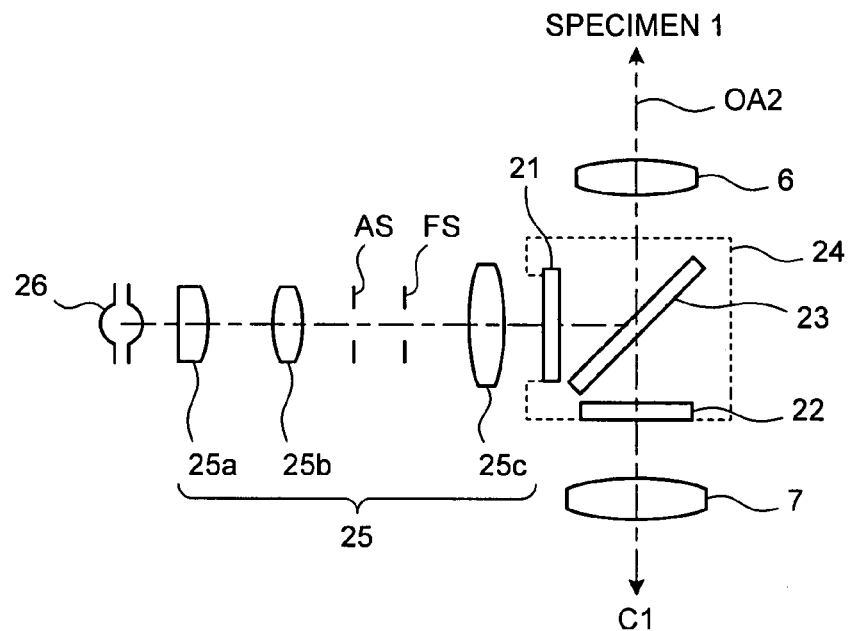
FIG. 17 is a diagram showing a structure of a substantial part when an incident-light fluorescent device is added to the low-light specimen image pickup apparatus shown in FIG. 6.

FIG. 17 is a schematic diagram showing a structure of a substantial part when an incident-light fluorescent device is provided to the low-light specimen image pickup apparatus according to the embodiment 2. As shown in FIG. 17, this incident-light fluorescent device has a fluorescent cube 24 serving as a fluorescent unit, a fluorescent flood light tube 25, and an excitation light source 26. The fluorescent cube 24 has an excitation filter 21 serving as an excitation light transmitting filter through which an excitation light for exciting the specimen 1 is selectively transmitted, an absorption filter 22 serving as a fluorescence transmitting filter through which fluorescence generated from the specimen 1 excited by an excitation light is selectively transmitted, a dichroic mirror 23 which reflects an excitation light and through which fluorescence is transmitted, so as to be integrated with each other. The fluorescent flood light tube 25 has a condenser lens 25a, an aperture stop lens 25b, a flood light lens 25c, an aperture stop AS, and a visual field stop FS concentrically.

The excitation light source 26 is a light source emitting excitation light, and is realized by a mercury lamp, a xenon lamp, a laser, or the like. The excitation light source 26 and the fluorescent flood light tube 25 serving as a fluorescent irradiation unit makes the dichroic mirror 23 reflect an excitation light to be irradiated onto the specimen 1. The excitation filter 21 is a band-pass filter extracting an excitation light among lights emitted from the excitation light source 26, and the absorption filter 22 is a longwave-pass filter having a predetermined cut-off wavelength. The fluorescent cube 24 is detachable to the optical axis OA2 between the objective lens 6 and the imaging lens 7. Note that, along with the fluorescent cube 24, a fluorescent cube switching device which integrally holds a plurality of replacement fluorescent cubes with different optical characteristics with respect to at least one of excitation light and fluorescence, and which selectively disposes one fluorescent cube among the held fluorescent cubes between the objective lens 6 and the imaging lens 7, may be provided.

As shown in FIG. 17, by adding the incident-light fluorescent device, it is possible to take an image of fluorescence of the specimen 1 in the low-light specimen image pickup apparatus according to the embodiment 2. Further, in accordance with the low-light specimen image pickup apparatus, because it is possible to observe low fluorescence, there is no need to irradiate intense excitation light onto a specimen as in a case in which an incident-light fluorescence laser scanning confocal microscope is used, and it is possible to reduce the damage on the specimen. Moreover, a scanning device such as an intensive excitation light source laser or a galvanometer mirror, a confocal optical system, a photo-multiplier, a processing device for image preparation, and the like are made unnecessary.

In a specimen to be an object, fluorescent illuminants such as living cells are scattered in a thickness direction of the specimen even at the time of observing fluorescence, and an object of observation is, not to observe fluorescence emission from a minute portion of the cell, but to roughly specify which portion of the cell the luminescence comes from, and to measure a quantity of the luminescence. Therefore, illumination suitable for such an object is preferably made to be illumination which has a light quantity distribution uniform on the entire visual field plane of the specimen, and which is uniform in the optical axis direction (in the thickness direction of the specimen) as well. This is because the equations (15) and (17) mean that the respective pixels of the CCD detect lights from luminescent fluorescent materials in the cylindrical volume of the specimen.

Figure 18:
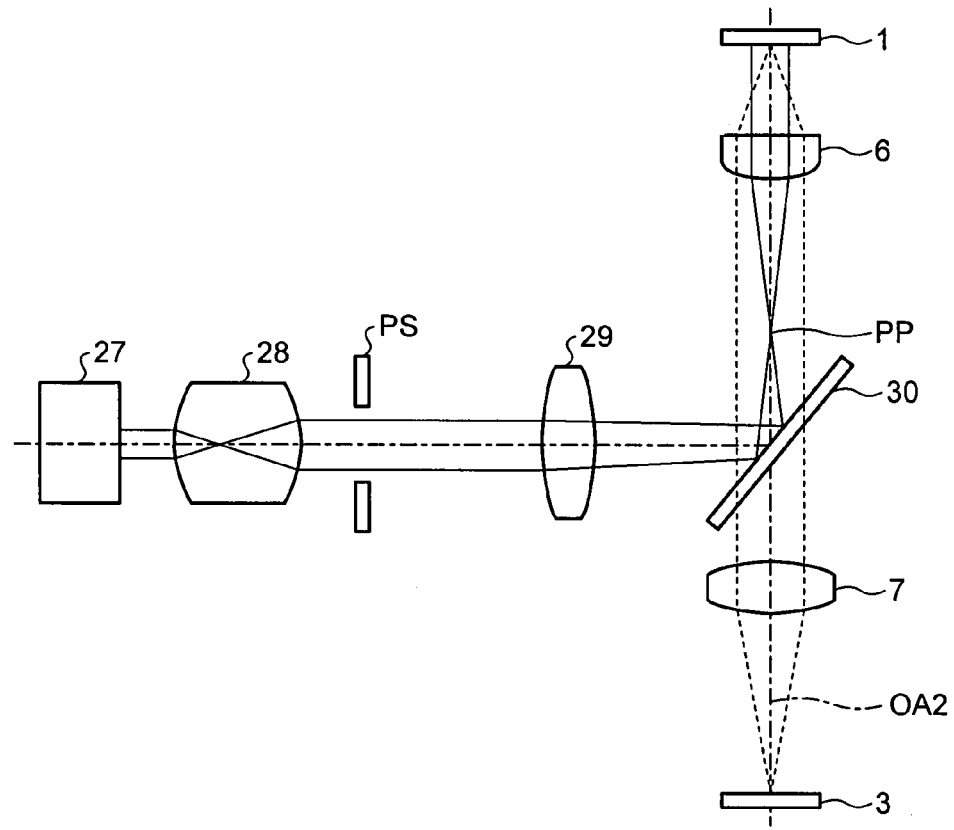
FIG. 18 is a diagram showing a structure of a substantial part when an incident-light fluorescence lighting system for parallel pencil illumination is added to the low-light specimen image pickup apparatus shown in FIG. 6.

FIG. 18 is a schematic diagram showing a structure of a substantial part when an incident-light fluorescent lighting system realizing such illumination is provided in the low-light specimen image pickup apparatus according to the embodiment 2. As shown in FIG. 18, this incident-light fluorescent lighting system has a parallel beam light source 27, a beam expander 28, an excitation pinhole PS, a flood light lens 29, and a wavelength selective mirror 30.

As the parallel beam light source 27, for example, a laser beam source is used, and an excitation light is emitted as parallel beams. The beam expander 28 expands the parallel beams emitted from the parallel beam light source 27, and makes them to transmit. The excitation pinhole PS is disposed at an anterior focal position of the flood light lens 29, and limits the parallel beams emitted from the beam expander 28 to a predetermined diameter of luminous flux to pass through. The flood light lens 29 condenses the parallel beams passing through the excitation pinhole PS at a posterior focal point PP of the objective lens 6 via the wavelength selective mirror 30. This condensed excitation light is made to be parallel beams again by the objective lens 6, and is irradiated onto the specimen 1. Thereafter, fluorescence emitted from the specimen 1 is formed as an image on the CCD 3 by the objective lens 6 and the imaging lens 7, and is detected.

In this way, by adding an incident-light fluorescence lighting system, in the low-light specimen image pickup apparatus according to the embodiment 2, it is possible to irradiate excitation light uniformly within the visual field plane and in the thickness direction, onto the specimen 1, and it is possible to observe low fluorescence emitted on the basis of the excitation light. Note that, when a mercury lamp or the like is used as an excitation light source in place of the laser light source, it is possible to make parallel beams by narrowing an aperture stop (not shown) down even though a quantity of excitation light is reduced. However, normally, because a specimen is illuminated by a surface light source in a Koehler illumination method, the aperture stop is not necessarily narrowed down.

In this way, the low-light specimen image pickup apparatus shown in FIGS. 17 and 18 can be used as a DNA-chip reader. A DNA chip is that several hundreds of a large variety of DNA pieces or synthetic oligonucleotides are applied at intervals of about 0.6 mm with a diameter of about 0.3 mm onto a resin substrate of glass, polystyrene, or the like, and is used for checking the expression of a gene, the existence of a specific gene, and the like. Usually, fluorescence emitted from the DNA chip is low.

A general DNA chip reader is a combination of a confocal optical system for laser irradiation and a high-speed moving scanning stage, and because photometry by this apparatus is a sum of quantities of luminescence at points onto which spot excitation light is irradiated, when a scanning width is changed, a quantity of measured light is changed every time, and it is impossible to measure an absolute quantity of light. For example, in a fluorescence reading device serving as a DNA chip reader disclosed in the Patent Document 3 as well, because an illumination visual field diameter on a specimen is as small as 0.2 mm, and a diameter of each synthetic nucleotide (hereinafter called DNA individual) applied on the DNA chip is 0.3 mm, weakness of a confocal optical system has been improved. However, the scanning stage system has not been changed.

Figure 19:
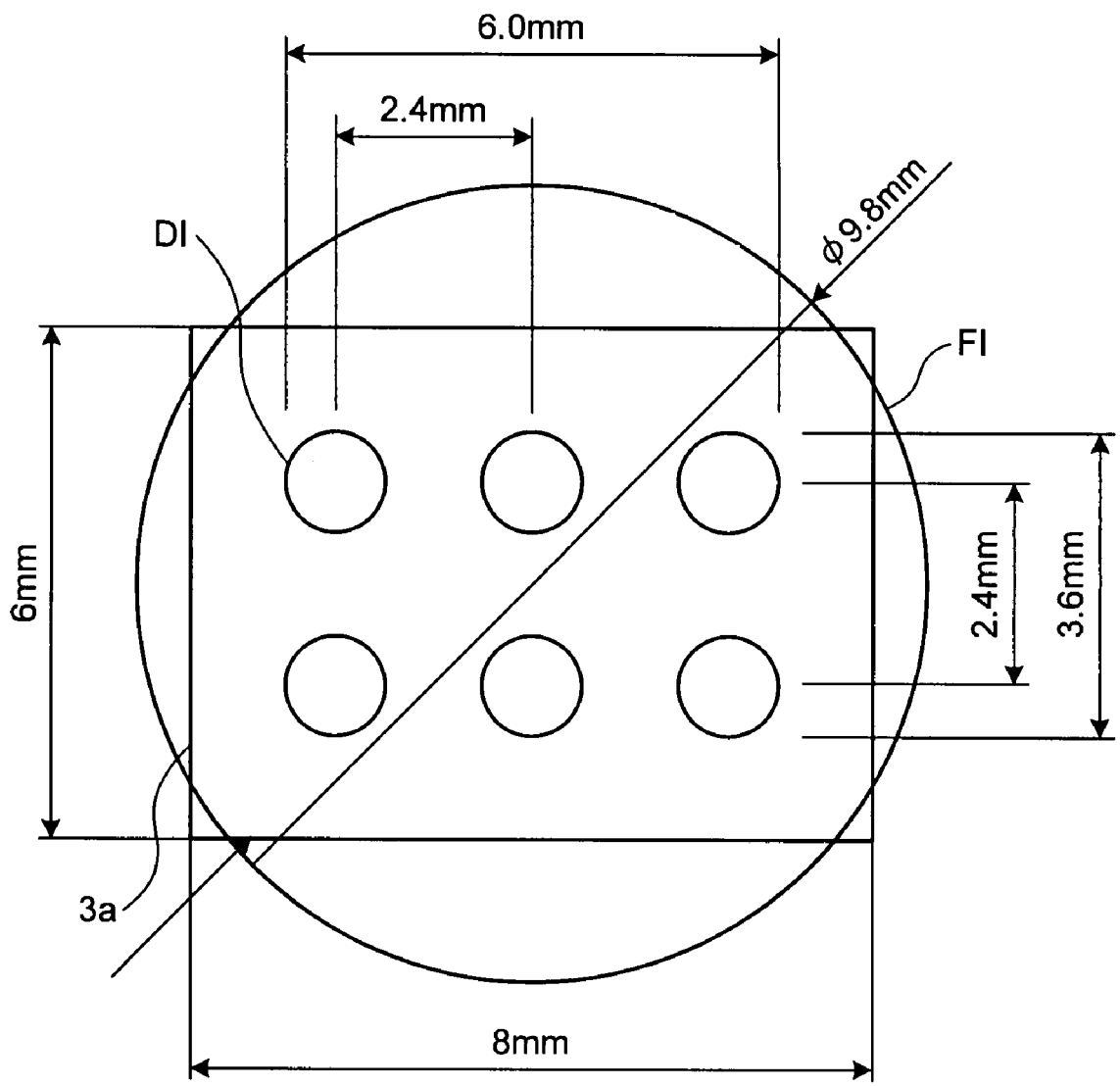
FIG. 19 is a diagram showing a correspondence relationship between DNA chips imaged by the low-light specimen image pickup apparatus shown in FIG. 6, and an image-pickup range of a CCD.

In contrast thereto, when the low-light specimen image pickup apparatus shown in FIG. 17 or FIG. 18 is used, provided that the stage holding the DNA chip is moved in steps of 0.6 mm with respect to an objective lens having a visual field with a diameter of 0.5 mm, and photometry is carried out every time of stopping it, it is possible to measure an absolute quantity of light. Further, provided that a 10× objective lens (an effective visual view is 2.4 mm) is used as the objective lens 6, and a total magnification of the imaging optical system is made to be 4×, and a ⅔-inch CCD (imaging area 8.8×6.6 mm) is used as the CCD 3, for example, as shown in FIG. 19, it is possible to carry out photometry of six DNA individuals collectively without moving the stage. Here, FIG. 19 is a diagram showing six DNA individual images DI formed on the imaging area 3a of the CCD 3, and a visual field image FI corresponding to the effective visual field. Note that there is no limit to an existing objective lens for microscope, and a lens having a broad visual field is designed, for example, the visual field of the objective lens is doubled, and the total magnification is doubled, which makes it possible to collectively carry out photometry of thirty DNA individuals.

Figure 20:
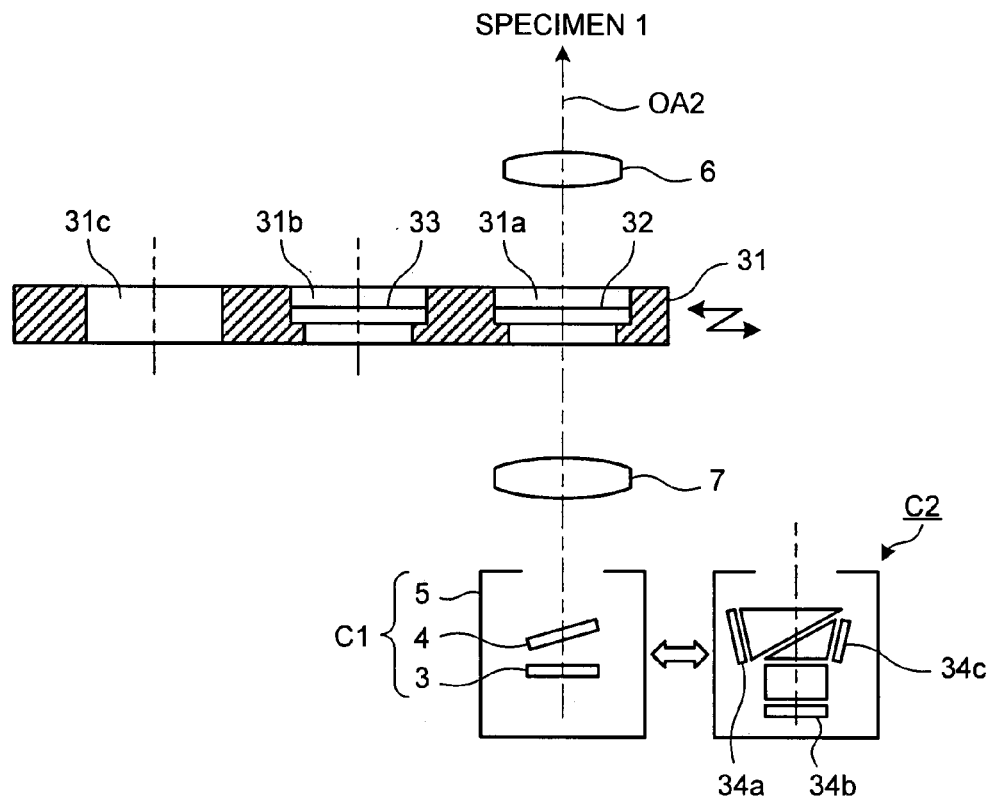
FIG. 20 is a diagram showing a structure of a substantial part when a filter unit is added to the low-light specimen image pickup apparatus shown in FIG. 6.

FIG. 20 is a schematic diagram showing a structure of a substantial part when a filter unit for spectrophotometry is provided to the low-light specimen image pickup apparatus according to the embodiment 2. As shown in FIG. 20, a filter unit for spectrophotometry 31 has wavelength extracting filters 32 and 33 respectively at holes 31a and 31b, and is disposed between the objective lens 6 and the imaging lens 7. The filter unit 31 is disposed so as to be slidable on a plane substantially perpendicular to the optical axis OA2, and selectively allocates one of the wavelength extracting filters 32 and 33, and a hole 31c on the optical axis OA2. Note that the filter unit 31 may be movable in a turret manner, and may hold more wavelength extracting filters.

When spectrophotometry is carried out, for example, with multicolored luciferase emitting light in two colors serving as the specimen 1 by utilizing the filter unit 31, the wavelength extracting filter 32 is preferably a longwave-pass filter through which light with a long wavelength of 650 nm or more is transmitted, and the wavelength extracting filter 33 is preferably a shortwave-pass filter through which light of a short wavelength of 550 nm or less is transmitted. Here, the luminescence property of the multicolored luciferase is expressed by the spectral property curves 35G and 35R shown in FIG. 21, and the transmittance characteristics of the wavelength extracting filters 32 and 33 are respectively expressed with the transmittance curves 32LP and 33SP shown in FIG. 21.

In this case, provided that the wavelength extracting filter 32 is allocated on the optical axis OA2 by the filter unit 31, it is possible to measure a red light emitted from the multicolored luciferase, and provided that the wavelength extracting filter 33 is allocated on the optical axis OA2, it is possible to measure a green light emitted from the multicolored luciferase. Further, provided that the hole 31c is allocated on the optical axis OA2, it is possible to observe a bright visual field image of the specimen 1. Note that, when the wavelength extracting filter 32 is allocated, a part of a wavelength band that the spectral property curves 35G and 35R are crossed over is measured. However, this light quantity is very small, which is negligible.

Further, as shown in FIG. 20, the camera C1 for detecting low light emitted from the specimen 1, and a camera C2 for taking a bright visual field image of the specimen 1 may be made to be switchable by a slider or the like, which makes it possible to takes a bright visual field image of the specimen 1 in colors. The camera C2 is, for example, a triple-plate color CCD camera having CCDs 34a to 34c, and the respective CCDs 34a to 34c are preferably high-definition CCDs whose pixels are smaller than those of the CCD 3. Further, the camera C2 may be a monochrome CCD camera having a high-definition monochrome CCD.

Figure 21:
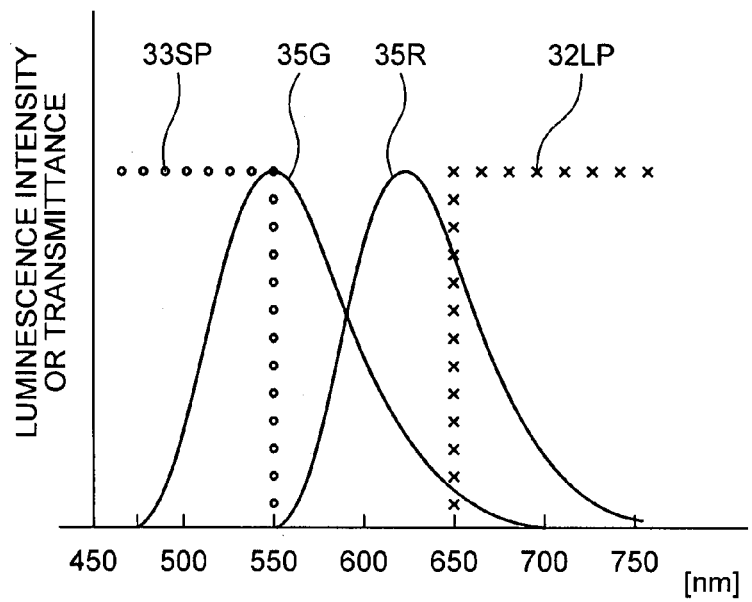
FIG. 21 is a graph showing luminescence properties of a multicolored luciferase gene and transmittance characteristics of wavelength extracting filters shown in FIG. 20.
Figure 22:
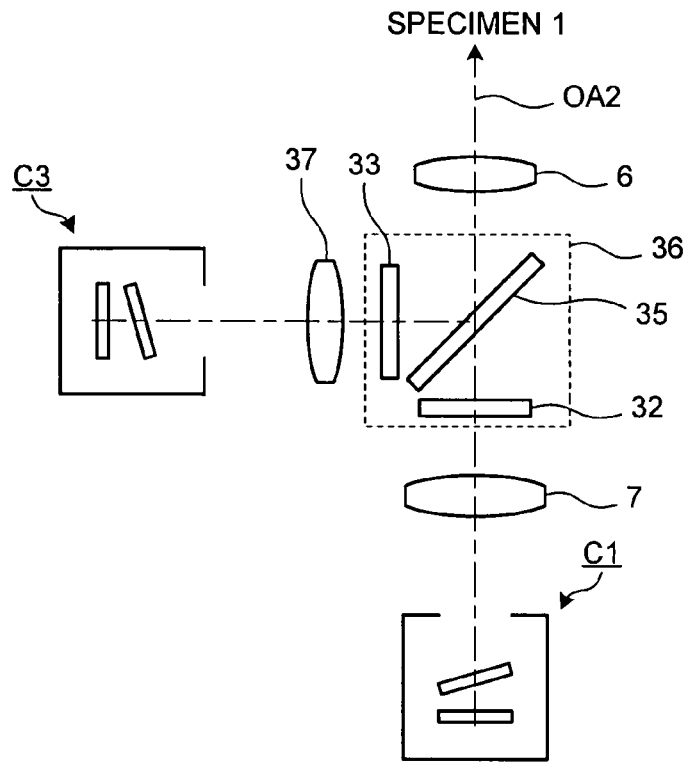
FIG. 22 is a diagram showing a structure of a substantial part when a spectroscopic unit is added to the low-light specimen image pickup apparatus shown in FIG. 6.

FIG. 22 is a schematic diagram showing a structure of a substantial part when a camera C3 for spectrophotometry is provided along with the camera C1 to the low-light specimen image pickup apparatus according to the embodiment 2. As shown in FIG. 22, this low-light specimen image pickup apparatus has a spectroscopic cube 36 having the wavelength extracting filters 32 and 33, and a dichroic mirror 35 integrally between the objective lens 6 and the imaging lens 7, and has an imaging lens 37 imaging low light which is emitted from the specimen 1 and is reflected on the dichroic mirror 35, so as to be telecentric at a numerical aperture Na$_i$, and the camera C3 having the same characteristic as the camera C1. Here, the dichroic mirror 35 makes a wavelength of about 600 nm corresponding to a cross point of the property curves 35G and 35R shown in FIG. 21 be a reversed wavelength of transmission and reflection, and makes a wavelength greater than or equal to the reversed wavelength transmit, and reflects a wavelength less than the reversed wavelength.

In this low-light specimen image pickup apparatus shown in FIG. 22, for example, when multicolored luciferase having luminescence property shown by the property curves 35G and 35R in FIG. 21 is observed as the specimen 1, it is possible to measure a red light emitted from the multicolored luciferase by the camera C1, and at the same time, it is possible to measure a green light emitted from the multicolored luciferase by the camera C3. Note that differences in imaging magnifications due to individual differences in the characteristics of the cameras C1 and C3, and the imaging lenses 7 and 37 are preferably eliminated by carrying out calibration in advance.

Note that the spectroscopic cube 36 is preferably detachable on the optical axis OA2 between the objective lens 6 and the imaging lens 7. Further, a plurality of replacement spectroscopic cubes having different optical properties such as spectral property may be integrally held along with the spectroscopic cube 36, and a spectroscopic cube switching device selectively disposing one spectroscopic cube among those between the objective lens 6 and the imaging lens 7, may be provided. Moreover, the spectroscopic cube switching device may be able to replace a dichroic mirror and wavelength extracting filters individually.

Figure 23:
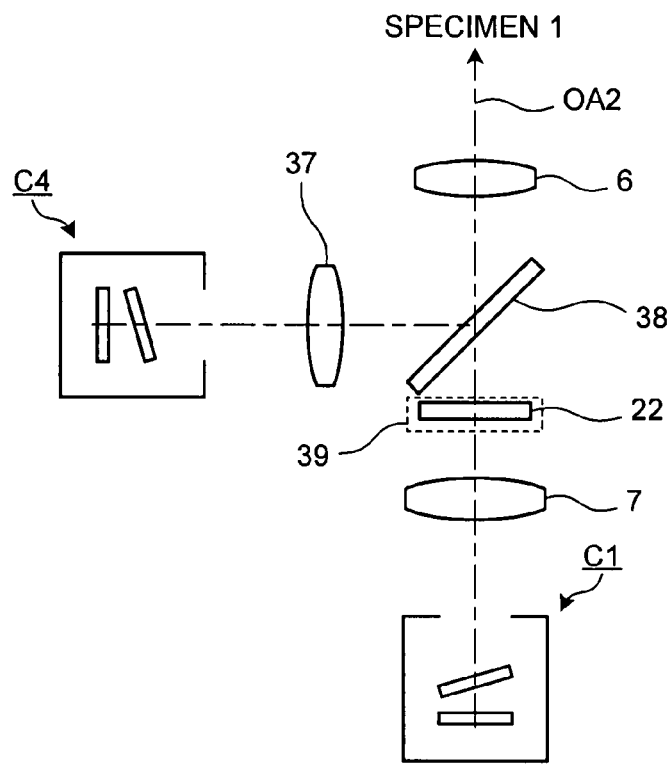
FIG. 23 is a diagram showing a structure of a substantial part when a mirror switching bright visual field image pickup unit is added to the low-light specimen image pickup apparatus shown in FIG. 6.

FIG. 23 is a schematic diagram showing a structure of a substantial part when a camera C4 for observing a bright visual field image is provided along with the camera C1 to the low-light specimen image pickup apparatus according to the embodiment 2. As shown in FIG. 23, the low-light specimen image pickup apparatus has a mirror 38, the imaging lens 37, the camera C4, and the absorption filter 22. The absorption filter 22 is detachable on the optical axis OA2 between the mirror 38 and the imaging lens 7 by a switching device 39 such as a slider. The mirror 38 is detachable on the optical axis OA2 between the objective lens 6 and the imaging lens 7 by an unillustrated inserting/detaching unit, and when this is disposed on the optical axis OA2, the light from the specimen 1 is reflected toward the imaging lens 37. Note that, when the mirror 38 is disposed on the optical axis OA2, a bright visual field illumination is carried out onto the specimen 1 by the illumination fiber 15.

The camera C4 is, for example, a monochrome CCD camera having a high-definition CCD whose pixels are smaller than those of the CCD 3, and when the mirror 38 is disposed on the optical axis OA2, a bright visual field image of the specimen 1 is taken. On the other hand, when the mirror 38 is not disposed on the optical axis OA2, an image by self-luminescence of the specimen 1 is taken. At that time, the absorption filter 22 and the switching device 39 may be replaced with the filter unit 31 shown in FIG. 20, and low light from the specimen 1 may be spectrophotometrically measured. Note that the camera C4 may be a triple-plate color CCD.

Generally, a high-sensitivity cooled CCD camera used as the camera C1 has a large housing, and, for example, it is difficult to replace cameras as shown in FIG. 20. However, in the low light image pickup apparatus shown in FIG. 23, it is possible to easily switch cameras to be used by attaching and detaching the mirror 38 on the optical axis OA2, and it is possible to easily switch imaging of a bright visual field image and an image by self-luminescence of the specimen 1.

Note that, in the low-light specimen image pickup apparatus shown in FIGS. 22 and 23, in order to carry out aligning of the camera C1 and the camera C3 or the camera C4, i.e., centering for conforming the centers of images to be taken by the respective cameras, a positioning mechanism which moves the imaging lens 7 or the camera C1 in a direction substantially perpendicular to the optical axis OA2 is desirably provided. Or, in the low-light specimen image pickup apparatus shown in FIG. 22, the imaging lens 37 or the camera C3 may be moved in a direction substantially perpendicular to the optical axis thereof, and in the low-light specimen image pickup apparatus shown in FIG. 23, the imaging lens 37 or the camera C4 may be moved in a direction substantially perpendicular to the optical axis thereof.

In this way, in the low-light specimen image pickup unit and the low-light specimen image pickup apparatus according to the embodiment 2, because the imaging optical system formed from the objective lens 6 and the imaging lens 7 is a system corrected at infinity, various optical elements are disposed between the objective lens 6 and the imaging lens 7, which makes it possible to make the low-light specimen image pickup apparatus multifunctional.

Figure 24:
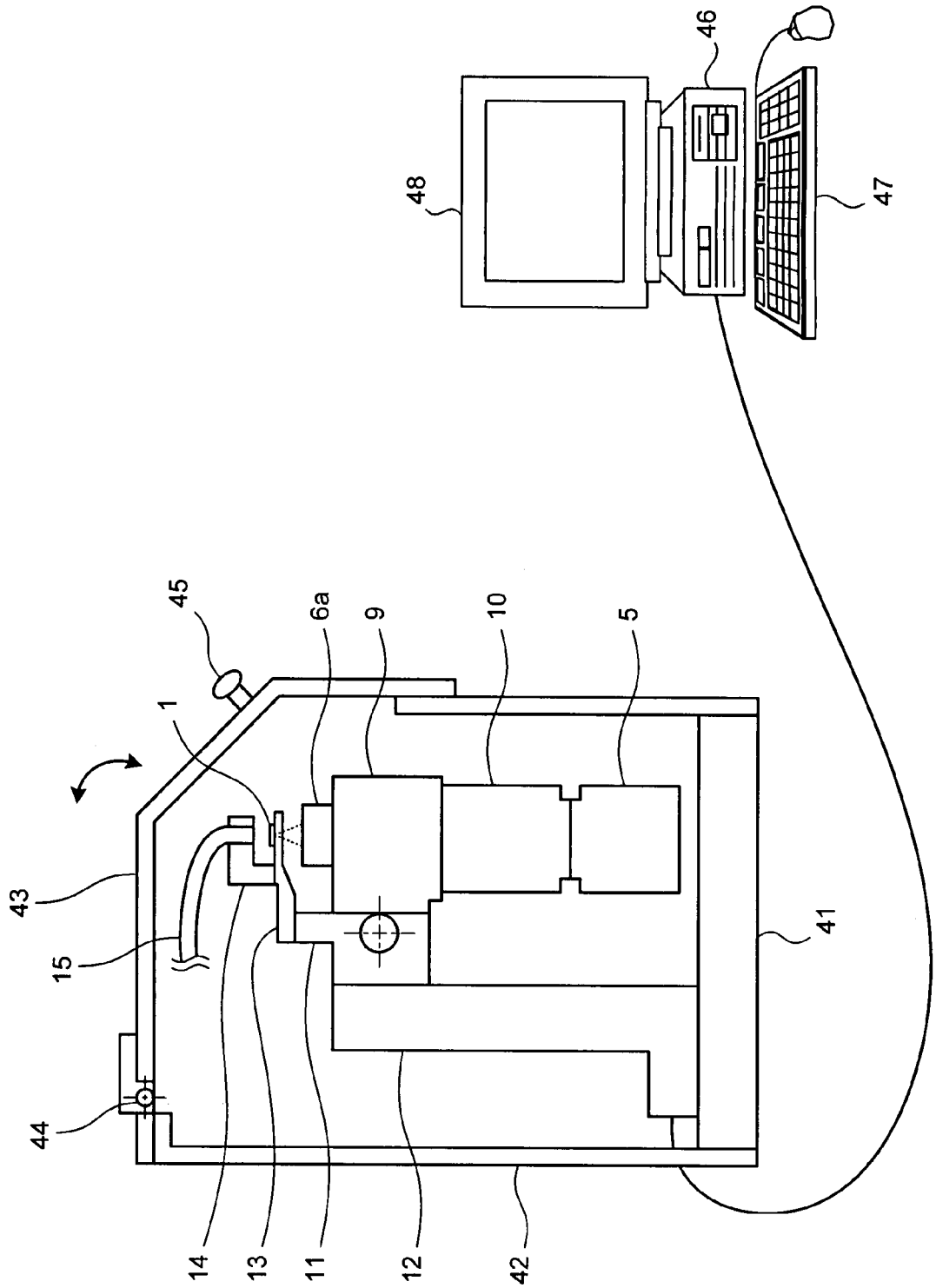
FIG. 24 is a diagram showing a structure when the low-light specimen image pickup apparatus shown in FIG. 6 is disposed in a shading apparatus, and automatic control is carried out from the outside thereof.

On the other hand, for example, as shown in FIG. 24, the low-light specimen image pickup apparatus according to the embodiment 2 is capable of detecting low light precisely and stably to be free from the influence of external light by disposing a shading apparatus such as a chamber shading light from the outside, and of taking an image by self-luminescence of the specimen 1 sharply. Here, the shading apparatus shown in FIG. 24 forms a dark room with a base 41, an enclosure 42, and a cover 43, and has the low-light specimen image pickup apparatus on the base 41 in this dark room. In this shading apparatus, the cover 43 is opened centering on a hinge 44 by holding up a knob 45, and it is possible to replace the specimen 1.

Further, as shown in FIG. 24, when the low-light specimen image pickup apparatus according to the embodiment 2 is disposed in the shading apparatus, the low-light specimen image pickup apparatus can be preferably remote-controlled and automatic-controlled from the outside of the shading apparatus by a control device 46 such as a computer having an input device 47 of a keyboard, a mouse, and the like, and in particular, this is preferably capable of automatic-controlling focusing and aligning operations with respect to the specimen 1, imaging operations of the camera C1 and the like, light-adjusting of illumination light by the illumination fiber 15, and the like.

Here, aligning with respect to the specimen 1 is processing of disposing the specimen 1 within a visual field of the objective lens 6 by moving at least one of the imaging optical system formed from the objective lens 6 and the imaging lens 7, the camera 1, and the specimen support 13 holding the specimen 1 in a direction substantially perpendicular to the optical axis OA2.

Further, as shown in FIG. 24, the control device 46 has a display device 48, and is preferably structured to be able to display images corresponding to a bright visual field image of the specimen 1 and an image by self-luminescence so as to be superimposed. Moreover, the control device 46 preferably has a memory unit for storing these images.

Figure 25:
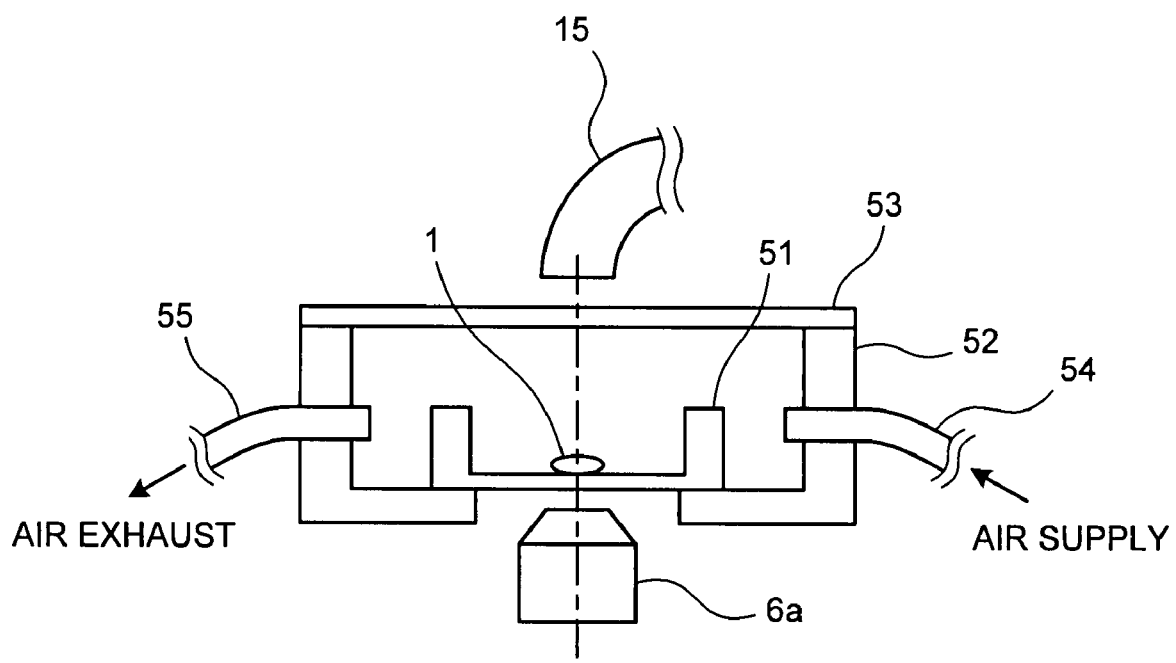
FIG. 25 is a diagram showing a structure of a container which holds internally a specimen 1 shown in FIG. 6, and in which environment conditions are variable.

On the other hand, in the low-light specimen image pickup apparatus according to the embodiment 2, for example, as shown in FIG. 25, a petri dish 51 and a closed vessel serving as a housing unit formed from a partition 52 and a transparent plate 53 may be provided, and the specimen 1 may be held on the petri dish 51. Here, this closed vessel has an air supply pipe 54 supplying $CO_2$ into the vessel at a constant temperature and a low humidity generated by an unillustrated air conditioner, and an air exhaust pipe 55 exhausting $CO_2$ in the vessel, and is capable of adjusting at least one of a temperature, humidity, an air pressure, and a $CO_2$ density in the vessel. Note that, instead of supplying and exhausting $CO_2$, a heat sheet or the like is provided inside the closed vessel, and temperature control or the like in the vessel may be electrically carried out.

Here, structures of the respective units suitable to be applied to the low-light specimen image pickup unit and the low-light specimen image pickup apparatus according to the embodiment 2 are systematically shown in FIG. 26. As shown in FIG. 26, as the objective lenses 6, an objective lens 6-1 specified as "Oil, 40×, NA1.4, f5 mm", and an objective lens 6-2 specified as "20-power, NA0.8, f10 mm", and an objective lens 6-3 specified as "5×, NA0.15, f40 mm" are preferably used. As these objective lenses 6-1 to 6-3, objective lenses for microscope which are generally available in the marked, and are designed to have a visual field number of about 24, and whose pupil positions are equivalent to one another, can be used. Further, the objective lens 6 specified as "Oil, 20×, NA1.4, f10 mm" which can make the visual field bigger may be used. However, in this case, an exit pupil diameter is enlarged to 28 mm, and diameters of the imaging lens 7 and the optical elements disposed therebetween are enlarged in addition to the objective lens 6, which makes it impossible to use optical units, optical elements, and the like used for general microscopes. Note that a variable aperture stop whose opening diameter is variable may be provided to the objective lens 6, which makes it possible to carry out fine adjustment of the numerical aperture $Na_i$ of the imaging lens 7, and this may be used for observing a transmitting bright visual field.

As the imaging lenses 7, as shown in FIG. 26, an imaging lens 7-1 specified as "NA0.35, f20 mm" (a total magnification is 4-powered, an effective visual field is 0.6 mm, and a visual field number is 2.4 at the time of using a 40× objective lens)", and an imaging lens 7-2 specified as "NA0.2, f40 mm" (a total magnification is 8×, an effective visual field is 0.6 mm, and a visual field number is 4.8 at the time of using a 40× objective lens)" are preferably used. Further, for observing a bright visual field, an imaging lens 7-3 specified as "NA0.03, f100 mm" (a total magnification is 2.5×, an effective visual field is 6 mm, and a visual field number is 15 at the time of using a 5× objective lens)" is preferably used.

Here, the optical specifications in a combination of the objective lens 6 and the imaging lens 7 described above, and the features thereof will be shown together in FIG. 27. Note that the "brightness" shown in FIG. 27 is index values based on the brightness when a dry and 20-power objective lens is used, and a total magnification is 4×.

As an intermediate lens-barrel disposed between the objective lens 6 and the imaging lens 7, the incident-light fluorescent device having the fluorescent cube 24 and the like shown in FIG. 17, the filter unit 31 shown in FIG. 20, the spectroscopic unit having the spectroscopic cube 36 and the like shown in FIG. 22, and the mirror switching bright visual field image pickup unit having the mirror 38 and the like shown in FIG. 23 are respectively used.

As cameras taking an image of the specimen 1, the cameras C1 and C3 which are high-sensitivity cooled monochrome CCD cameras are used as cameras taking an image by self-luminescence of the specimen 1 which is low light, and the camera C2 which is a triple-plate color CCD camera or the camera C4 which is a high-definition monochrome CCD camera may be used as a camera taking a bright visual field image of the specimen 1. Note that the sizes of pixels of the cameras C1 and C3 are made to be about 6 to 9 μm-square, and are preferably selected to correspond to the size of an Airy disk formed by the imaging lens 7.

As an illumination unit illuminating the specimen 1, in addition to the illumination fiber 15 introducing illumination light from a white light source or the like, as shown in FIG. 26, a lighting system realizing critical illumination by combining a white LED and a single lens, an UCD for microscope which is a Kohler illumination device using a condenser lens, or the like may be used. Further, a lighting system carrying out differential inference observation or phase-contrast observation may be provided. However, in this case, it is necessary to provide a single-purpose ring stop, a prism, an objective lens, and the like.

Note that the low-light specimen image pickup unit and the low-light specimen image pickup apparatus according to the embodiment 2 have been described as an inverted type. However, they may be an erecting type.

Further, in the low-light specimen image pickup unit according to the embodiment 1 and the embodiment 2, the CCD is used as an image pickup unit. However, this is not limited thereto, and it may be an image pickup device such as a CMOS, and may be an image pickup device having imaging sensitivity which is the same as that of a cooled CCD of about 0° C.

INDUSTRIAL APPLICABILITY

As described above, the low-light specimen image pickup unit and the low-light specimen image pickup apparatus according to the present invention are useful as a low-light specimen image pickup unit and a low-light specimen image pickup apparatus which take an image of a specimen emitting low light, and are suitable for a low-light specimen image pickup unit and a low-light specimen image pickup apparatus which take an image of a specimen having minute sources of luminescence such as a specimen generating low fluorescence or a bioluminescent specimen.

The invention claimed is:

1. A low-light specimen image pickup unit that has an imaging optical system and an image pickup unit, the imaging optical system forming a specimen image of a specimen having a point light source emitting a low light, the image pickup unit having a plurality of pixels receiving incident light, the image pickup unit taking an image corresponding to the specimen image, wherein the imaging optical system is telecentric on a specimen image side of the imaging optical system, and condenses the low light emitted from the point light source to form an Airy disk of a size which is smaller than or substantially equal to a size of a pixel of the pixels, the pixel receiving the low light emitted from the point light source.

2. The low-light specimen image pickup unit according to claim 1, wherein the imaging optical system has an objective lens and an imaging lens, the objective lens being telecentric on the specimen image side of the imaging optical system and converting the low light emitted from the point light source into a parallel beam, the imaging lens condensing the parallel beam to form the Airy disk.

3. The low-light specimen image pickup unit according to claim 2, wherein the objective lens is replaceable with a replacement objective lens different from the objective lens in at least one of a focal length and a specimen-side numerical aperture.

4. The low-light specimen image pickup unit according to claim 3, wherein the objective lens has an objective layout datum plane serving as a reference position when the objective lens is disposed, and is replaceable with the replacement objective lens substantially similar to the objective lens in distances from the objective layout datum plane to a specimen-side focal point and to an exit pupil.

5. The low-light specimen image pickup unit according to claim 2, wherein the objective lens has a variable aperture stop whose opening diameter is variable.

6. The low-light specimen image pickup unit according to claim 2, wherein the imaging lens is replaceable with a replacement imaging lens different from the imaging lens in at least one of a focal length and a specimen-side numerical aperture.

7. The low-light specimen image pickup unit according to claim 6, wherein the imaging lens has an imaging layout datum plane serving as a reference position when the imaging lens is disposed, and is replaceable with the replacement imaging lens substantially similar to the imaging lens in distances from the imaging layout datum plane to a specimen-side focal point and to an exit pupil.

8. The low-light specimen image pickup unit according to claim 2, wherein
the imaging lens has an entrance pupil diameter of a size which is greater than or equal to an exit pupil diameter of the objective lens.

9. The low-light specimen image pickup unit according to claim 2, wherein
the image pickup unit is replaceable with a replacement image pickup unit different from the image pickup unit in a predetermined imaging property.

10. The low-light specimen image pickup unit according to claim 1, wherein
an imaging magnification of the imaging optical system is greater than or equal to substantially 2×, and less than or equal to substantially 8×.

11. A low-light specimen image pickup apparatus comprising:
the low-light specimen image pickup unit according to claim 1;
a specimen holding unit that holds the specimen;
an illumination unit that illuminates the specimen; and
a focus adjusting unit that focuses the low-light specimen image pickup unit on the specimen by moving at least one of the imaging optical system, the image pickup unit, and the specimen holding unit in an optical axis direction of the low-light specimen image pickup unit, wherein
the imaging optical system condenses an illumination light which is irradiated by the illumination unit and transmitted through or reflected on the specimen so that a bright visual field specimen image of the specimen is formed, and
the focus adjusting unit performs the focusing so as to form the bright visual field specimen image sharply.

12. A low-light specimen image pickup apparatus comprising:
the low-light specimen image pickup unit according to claim 2;
a specimen holding unit that holds the specimen;
an illumination unit that illuminates the specimen; and
a focus adjusting unit that focuses the low-light specimen image pickup unit on the specimen by moving at least one of the objective lens, the imaging lens, the image pickup unit, and the specimen holding unit in an optical axis direction of the low-light specimen image pickup unit, wherein
the imaging optical system condenses illumination light which is irradiated by the illumination unit transmitted through or reflected on the specimen so that a bright visual field specimen image of the specimen is formed, and
the focus adjusting unit performs the focusing so as to form the bright visual field specimen image sharply.

13. The low-light specimen image pickup apparatus according to claim 12 comprising:
a fluorescent unit that has an excitation light transmitting filter, a fluorescence transmitting filter, and a dichroic mirror, the fluorescent unit being detachable between the objective lens and the imaging lens, the excitation light transmitting filter selectively transmitting an excitation light exciting the specimen, the fluorescence transmitting filter selectively transmitting a fluorescence generated from the specimen excited by the excitation light, the dichroic mirror reflecting the excitation light and transmitting the fluorescence; and
a fluorescence irradiating unit that has an excitation light source emitting an excitation light, and controls to reflect the excitation light emitted from the excitation light source by the dichroic mirror to be irradiated onto the specimen, wherein
the imaging optical system condenses the fluorescence as the low light to form the Airy disk.

14. The low-light specimen image pickup apparatus according to claim 13, further comprising a fluorescence switching unit that holds a plurality of the fluorescent units different from one another in optical properties with respect to at least one of the excitation light and the fluorescence, and selectively disposes one fluorescent unit among the plurality of the fluorescent units between the objective lens and the imaging lens.

15. The low-light specimen image pickup apparatus according to claim 13, wherein the fluorescence irradiating unit irradiates the excitation light as a substantially parallel beam onto the specimen.

16. The low-light specimen image pickup apparatus according to claim 12, further comprising a wavelength extracting filter that is detachable between the objective lens and the imaging lens, and extracts a light within a predetermined wavelength band from the low light.

17. The low-light specimen image pickup apparatus according to claim 16, further comprising a filter switching unit that holds a plurality of the wavelength extracting filters different from one another in a wavelength band to be extracted, and selectively disposes, at least one wavelength extracting filter among the plurality of the wavelength extracting filters between the objective lens and the imaging lens.

18. The low-light specimen image pickup apparatus according to claim 12, further comprising:
a dichroic mirror that is detachable between the objective lens and the imaging lens, the dichroic mirror transmitting a light within a predetermined first wavelength band among the low light, the dichroic mirror reflecting a light within a second wavelength band different from the first wavelength band;
a reflecting side imaging lens that condenses the light within the second wavelength band reflected by the dichroic mirror; and
a reflecting side image pickup unit that has a plurality of pixels, the reflecting side image pickup unit receiving the light within the second wavelength band condensed by the reflecting side imaging lens, wherein
the reflecting side imaging lens forms an Airy disk of a size internally touching a light receiving area of the pixel which the reflecting side image pickup unit has.

19. The low-light specimen image pickup apparatus according to claim 18, further comprising a dichroic mirror switching unit that holds a plurality of the dichroic mirrors different from one another in at least one of the first wavelength band and the second wavelength band, the dichroic mirror switching unit selectively disposing one dichroic mirror among the plurality of the dichroic mirrors between the objective lens and the imaging lens.

20. The low-light specimen image pickup apparatus according to claim 18, further comprising:
a transmitting side wavelength extracting filter that is detachable between the dichroic mirror and the imaging lens, and extracts a light within a predetermined third wavelength band from the light within the first wavelength band; and
a reflecting side wavelength extracting filter that is detachable between the dichroic mirror and the reflecting side imaging lens, and extracts a light within a predetermined fourth wavelength band from the light within the second wavelength band.

21. The low-light specimen image pickup apparatus according to claim 12, further comprising:
   a mirror that is detachable between the objective lens and the imaging lens, and reflects the illumination light transmitted through or reflected on the specimen;
   a bright visual field imaging lens that condenses an irradiation light reflected by the mirror to form a bright visual field image of the specimen; and
   a bright visual field image pickup unit that takes a bright visual field image corresponding to the bright visual field image formed by the bright visual field imaging lens.

22. The low-light specimen image pickup apparatus according to claim 18, further comprising a positioning unit that performs aligning of at least one of the image pickup unit, the reflecting side image pickup unit, and the bright visual field image pickup unit by moving the imaging optical system or the image pickup unit in a direction substantially perpendicular to an optical axis of the low-light specimen image pickup unit.

23. The low-light specimen image pickup apparatus according to claim 22, further comprising a condition control unit that performs an automatic control of at least one of the focusing by the focus adjusting unit and the alignment by the positioning unit.

24. The low-light specimen image pickup apparatus according to claim 11, wherein
   the specimen holding unit has
   a housing unit that holds the specimen internally, and
   an environment adjusting unit that adjusts an environment condition inside the housing unit.

25. The low-light specimen image pickup apparatus according to claim 24, wherein the environment condition is a condition corresponding to at least one of a temperature, a humidity, an air pressure, and a component density inside the housing unit.

26. The low-light specimen image pickup apparatus according to claim 11, wherein the low-light specimen image pickup apparatus is disposed in a shading unit that shades a light from outside.

27. The low-light specimen image pickup apparatus according to claim 11, further comprising a display unit that superimposes an image corresponding to the bright visual field specimen image and an image corresponding to the specimen image by the low light with each other, and displays the superimposed images, the images being taken by the image pickup unit.

28. The low-light specimen image pickup apparatus according to claim 12, wherein
   the specimen holding unit has
   a housing unit that holds the specimen internally, and
   an environment adjusting unit that adjusts an environment condition inside the housing unit.

29. The low-light specimen image pickup apparatus according to claim 12, wherein the low-light specimen image pickup apparatus is disposed in a shading unit that shades a light from outside.

30. The low-light specimen image pickup apparatus according to claim 12, further comprising a display unit that superimposes an image corresponding to the bright visual field specimen image and an image corresponding to the specimen image by the low light with each other, and displays the superimposed images, the images being taken by the image pickup unit.

* * * * *